(12) United States Patent
Hagiwara

(10) Patent No.: US 6,760,666 B2
(45) Date of Patent: Jul. 6, 2004

(54) METHOD FOR DETERMINING ANISOTROPIC RESISTIVITY AND DIP ANGLE IN AN EARTH FORMATION

(75) Inventor: Teruhiko Hagiwara, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/308,733

(22) Filed: Dec. 3, 2002

(65) Prior Publication Data

US 2003/0105591 A1 Jun. 5, 2003

Related U.S. Application Data

(60) Provisional application No. 60/336,996, filed on Dec. 3, 2001.

(51) Int. Cl.$^7$ .................................................. G01V 3/18
(52) U.S. Cl. ............................................ 702/7; 324/343
(58) Field of Search ..................... 702/6, 7; 324/339, 324/343

(56) References Cited

U.S. PATENT DOCUMENTS

| | | | |
|---|---|---|---|
| 3,808,520 A | 4/1974 | Runge | ............................ 324/6 |
| 4,302,723 A | 11/1981 | Moran | |
| 5,656,930 A | 8/1997 | Hagiwara | .................... 324/339 |
| 5,703,773 A | 12/1997 | Tabarovsky et al. | |
| 5,999,883 A | 12/1999 | Gupta et al. | .................... 702/7 |
| 6,044,325 A | 3/2000 | Chakravarthy et al. | |
| 6,218,841 B1 | 4/2001 | Wu | ............................ 324/338 |
| 6,393,364 B1 * | 5/2002 | Gao et al. | ....................... 702/7 |
| 6,442,488 B2 * | 8/2002 | Xiao et al. | ...................... 702/9 |
| 6,502,036 B2 * | 12/2002 | Zhang et al. | ................... 702/7 |
| 6,556,016 B2 * | 4/2003 | Gao et al. | ....................... 702/7 |
| 2001/0039477 A1 * | 11/2001 | Xiao et al. | ..................... 702/6 |

FOREIGN PATENT DOCUMENTS

EP 527089 A2 6/1992

* cited by examiner

Primary Examiner—Donald McElheny, Jr.

(57) ABSTRACT

A method for determining the anisotropic resistivity properties of a subterranean formation traversed by a borehole utilizing a multi-component induction logging tool. The method utilizes the measured phase and attenuation signals induced by eddy currents in the formation to determine the azimuthal angle and to create a second set of signals based on the measured signals and the azimuthal angle. The anisotropic resistive properties, as well as the dip angle, are then simultaneously derived from the second set of signals by means of minimizing error functions within an inversion model.

6 Claims, 18 Drawing Sheets

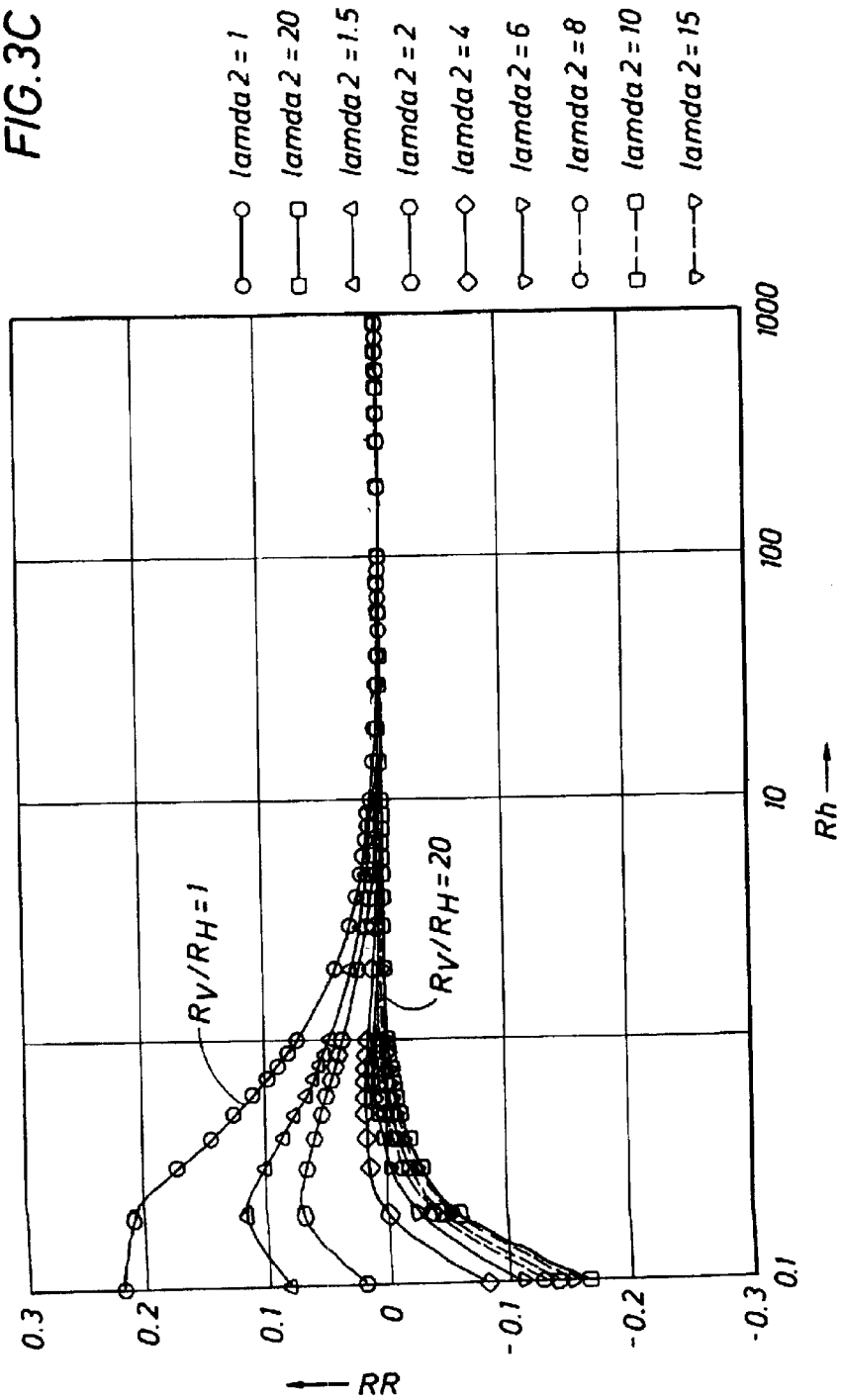

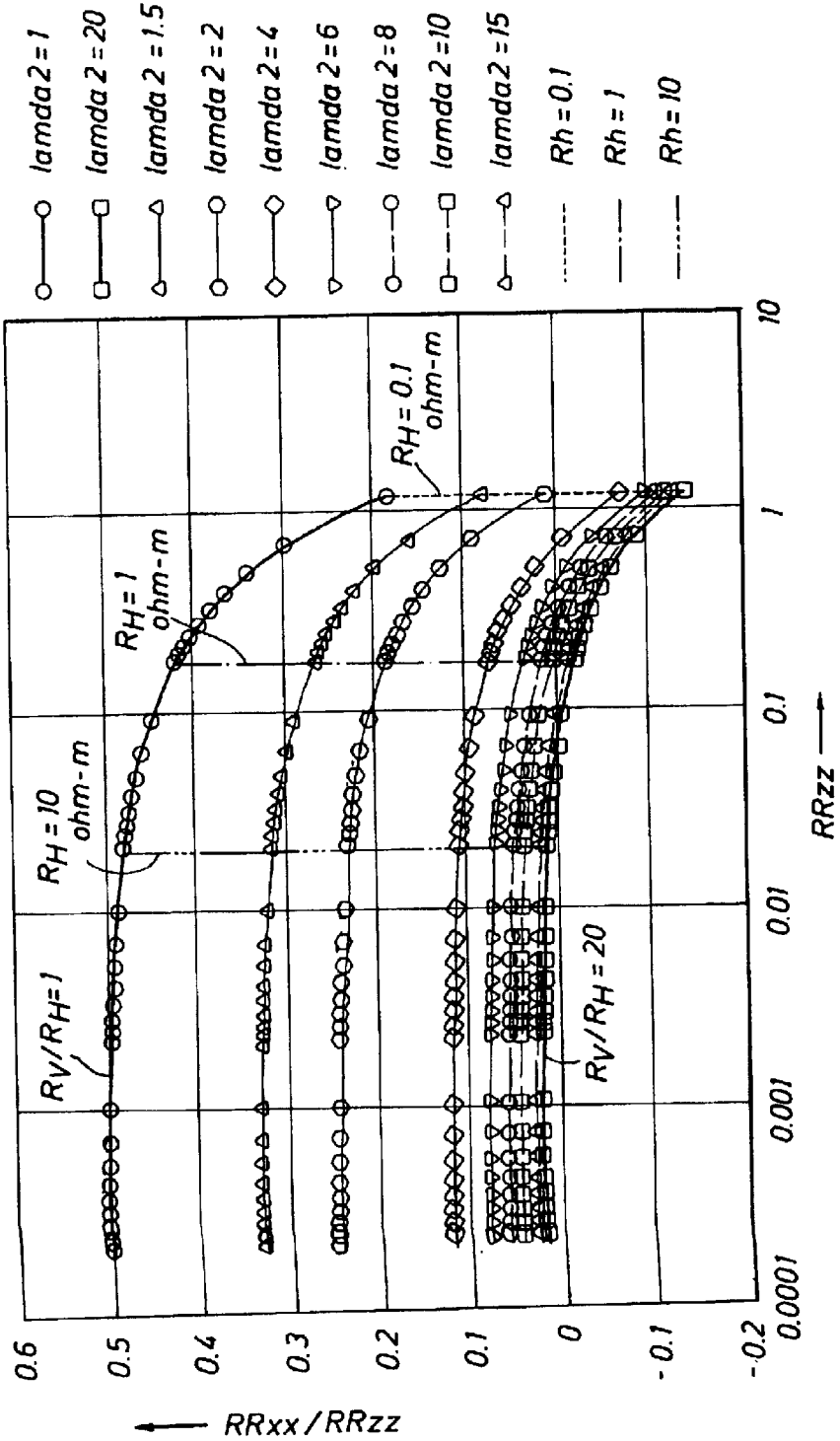

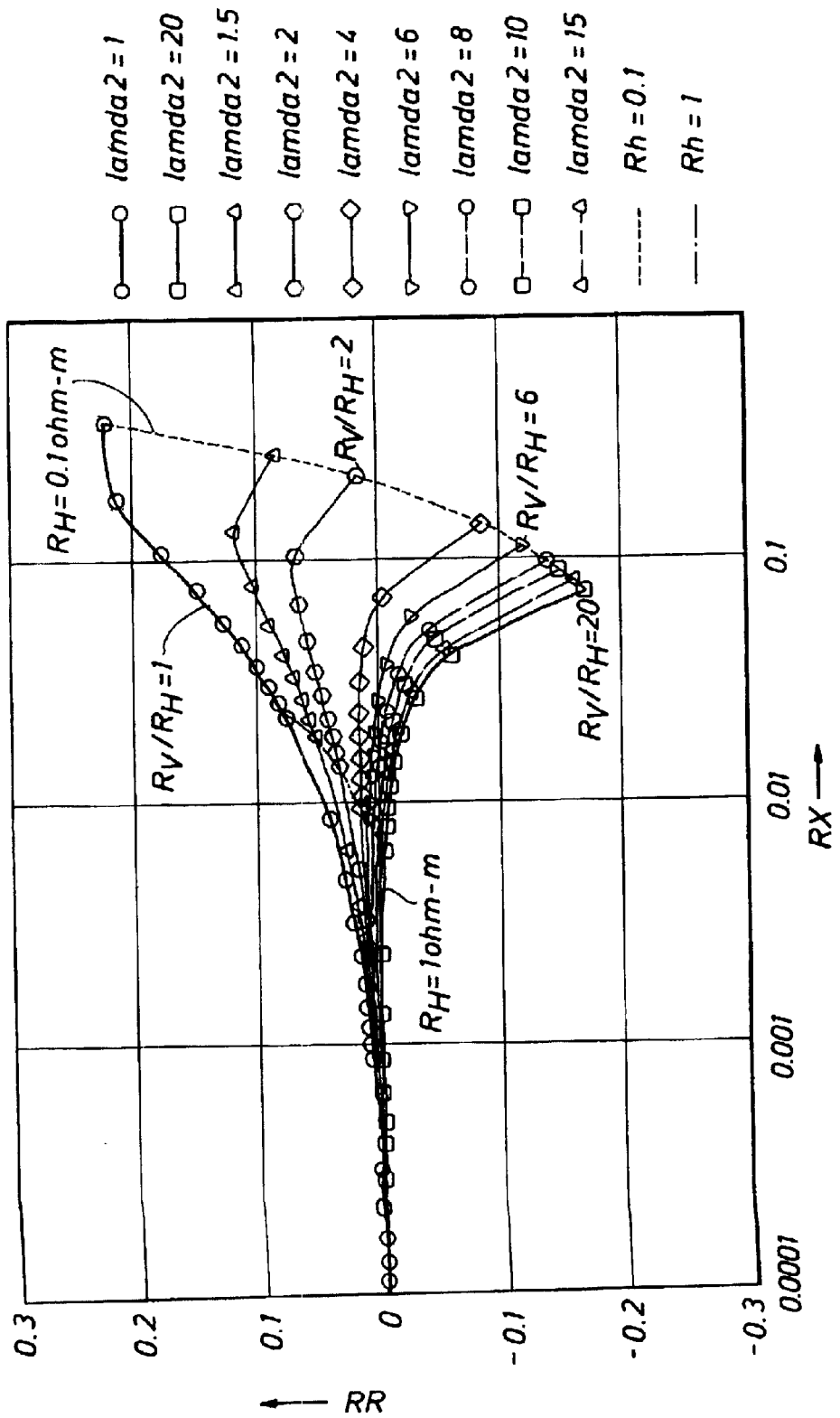

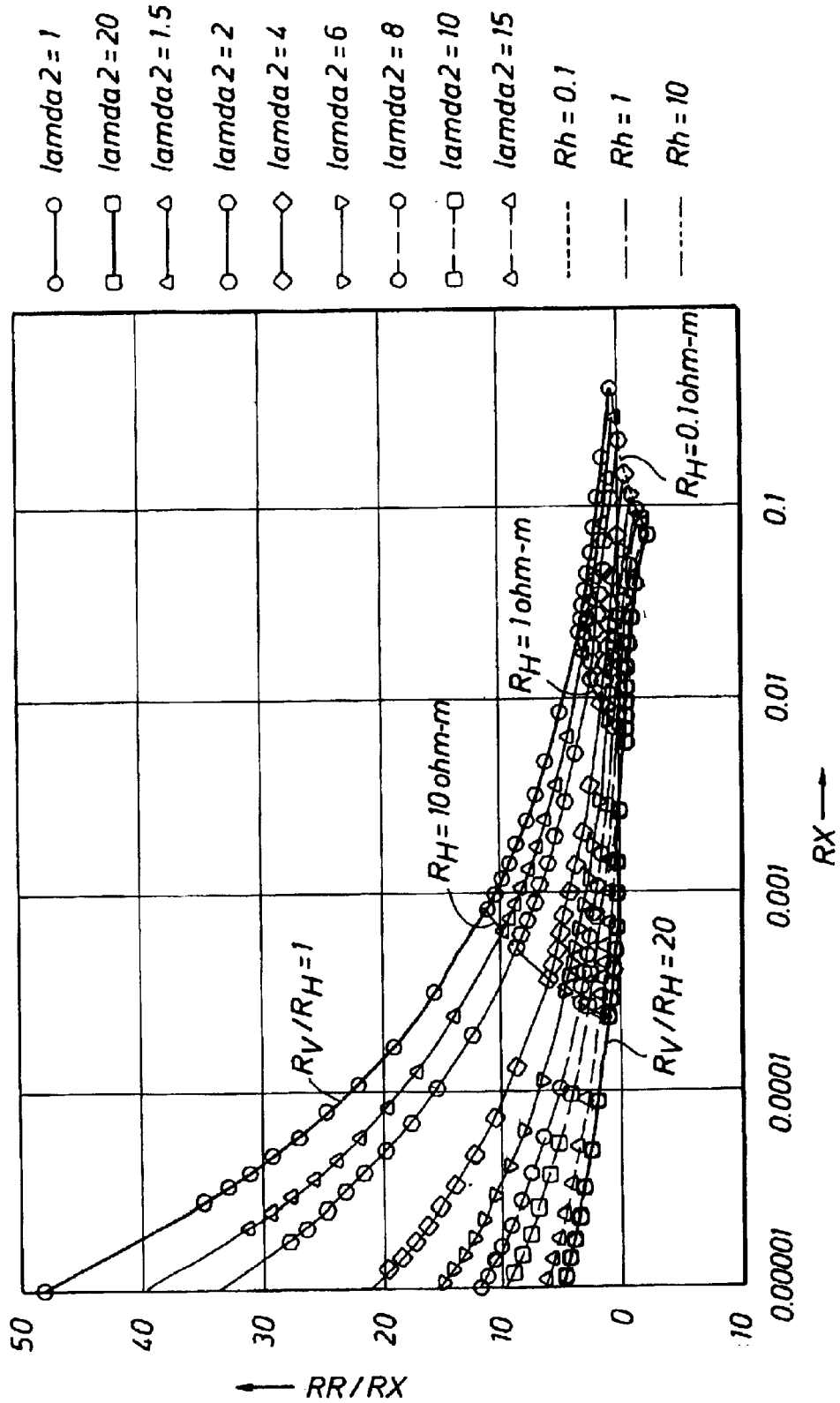

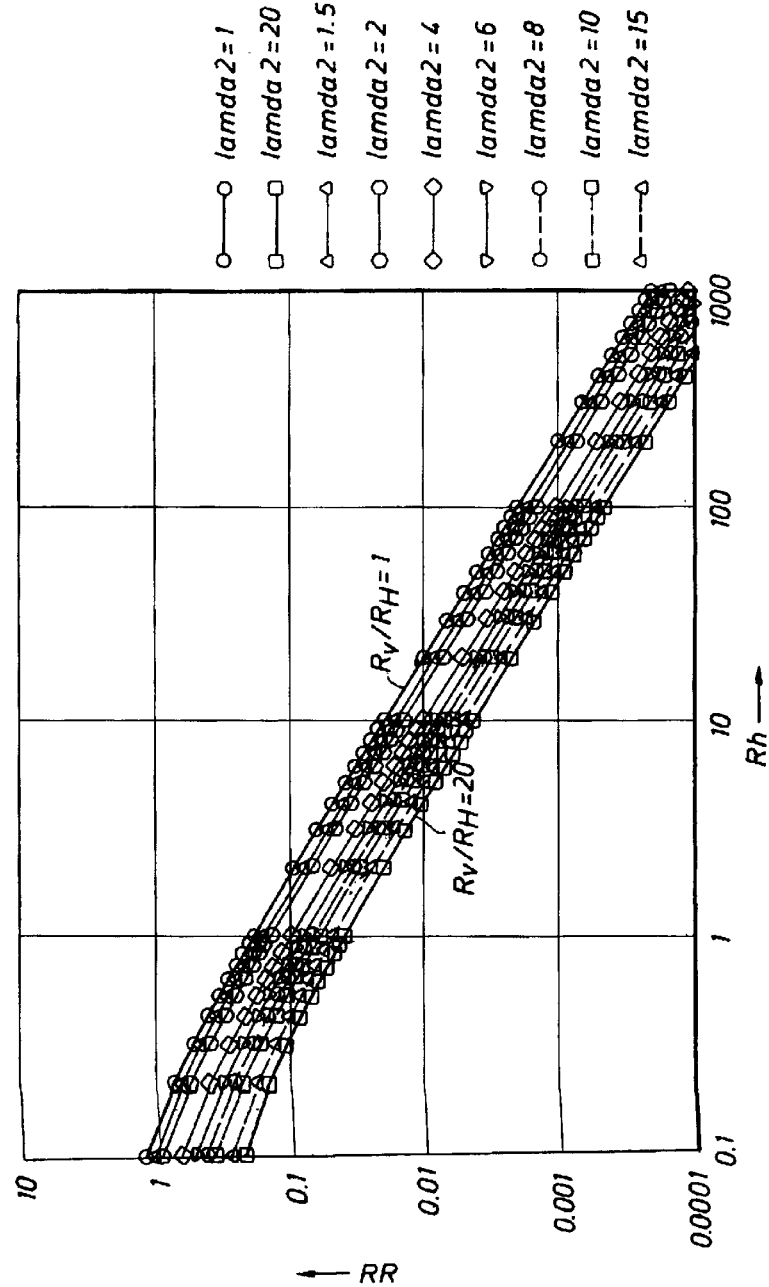

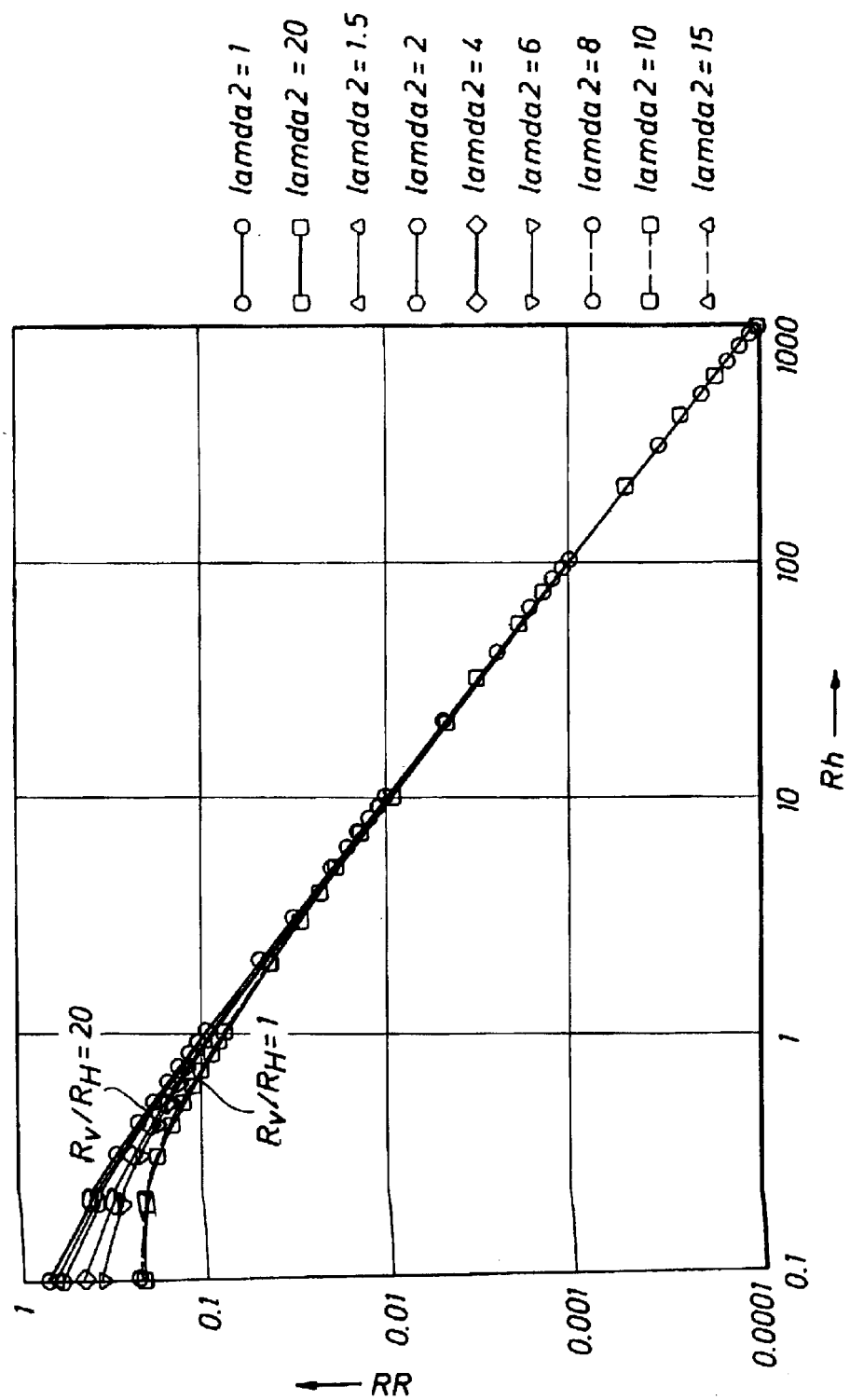

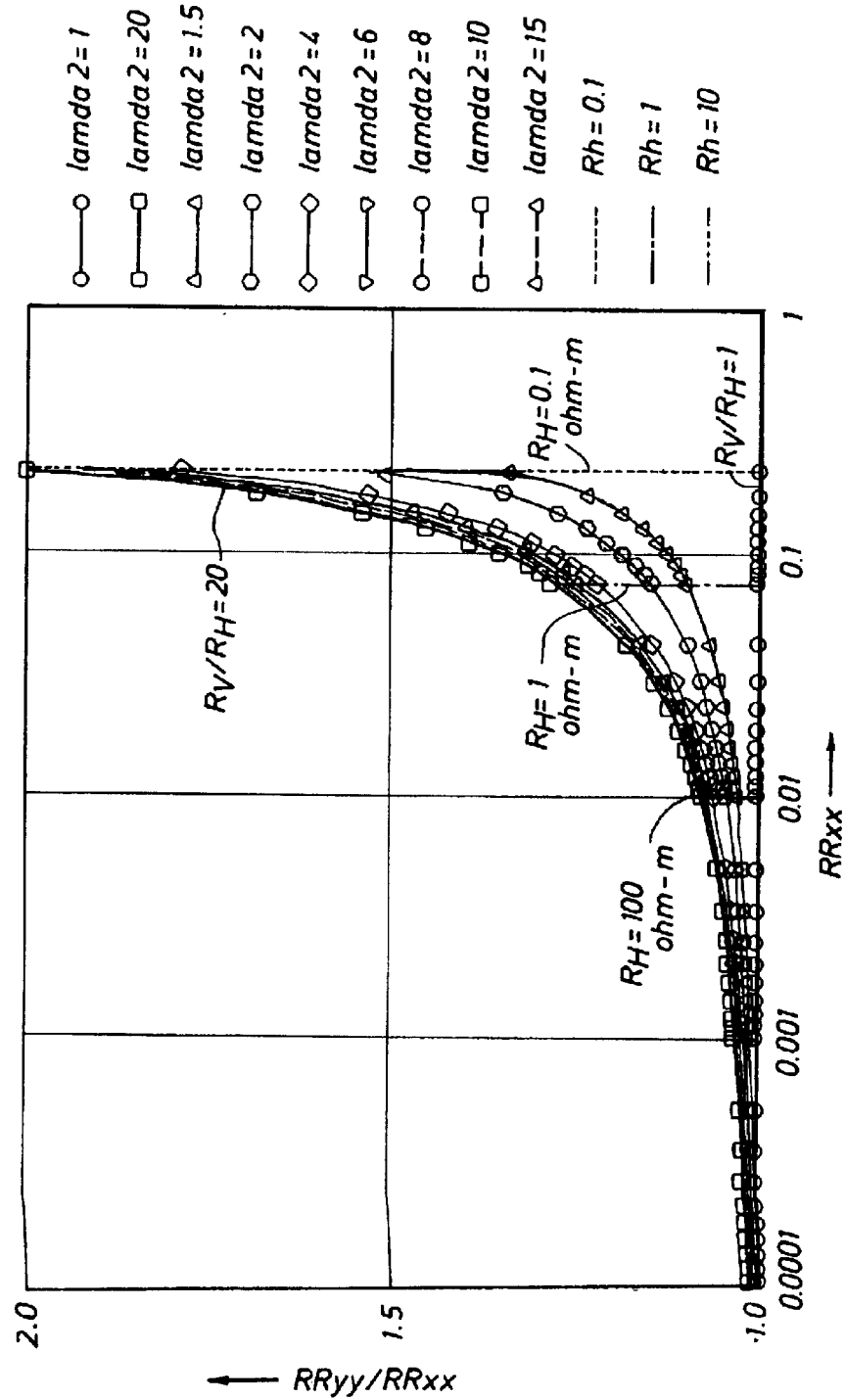

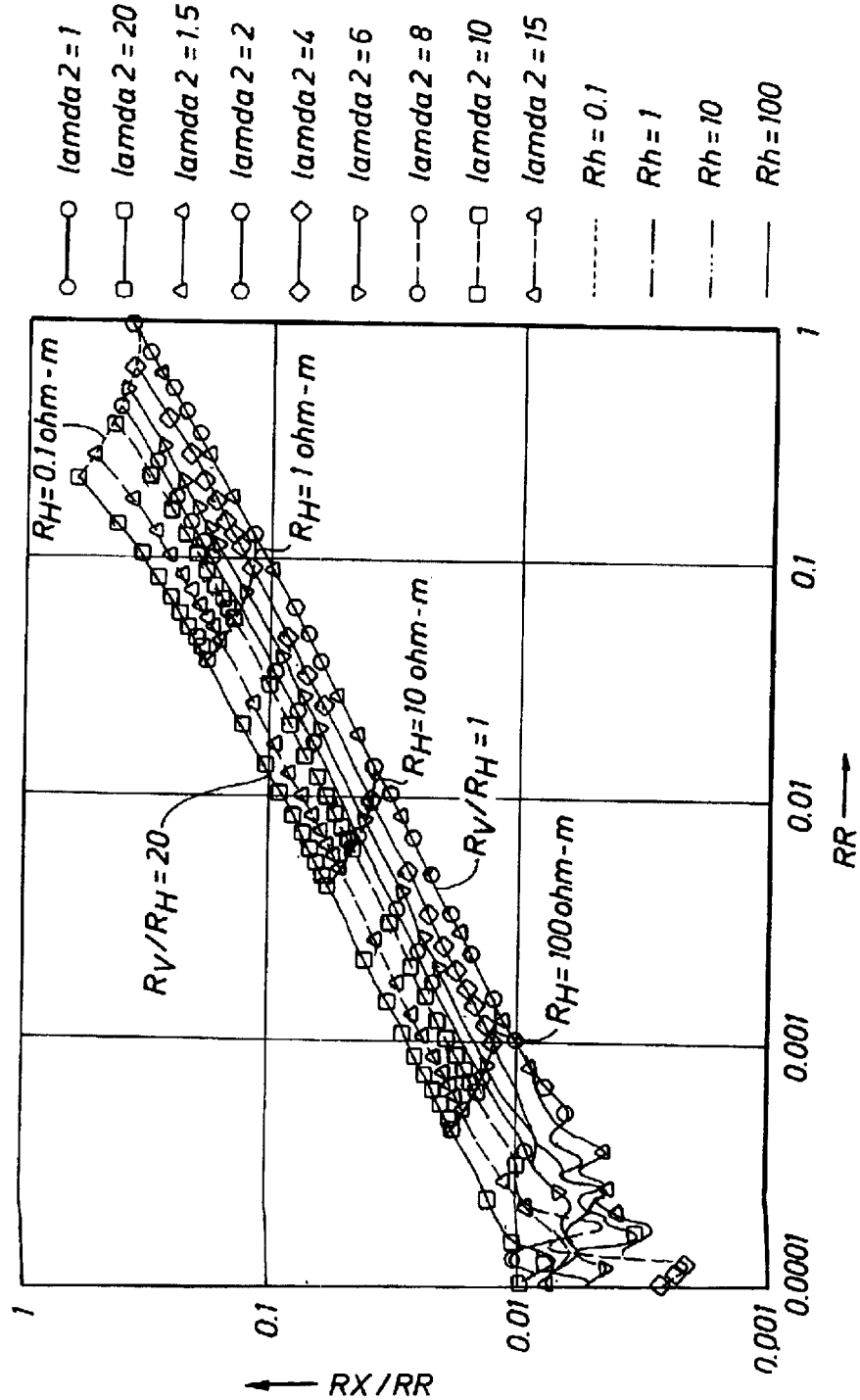

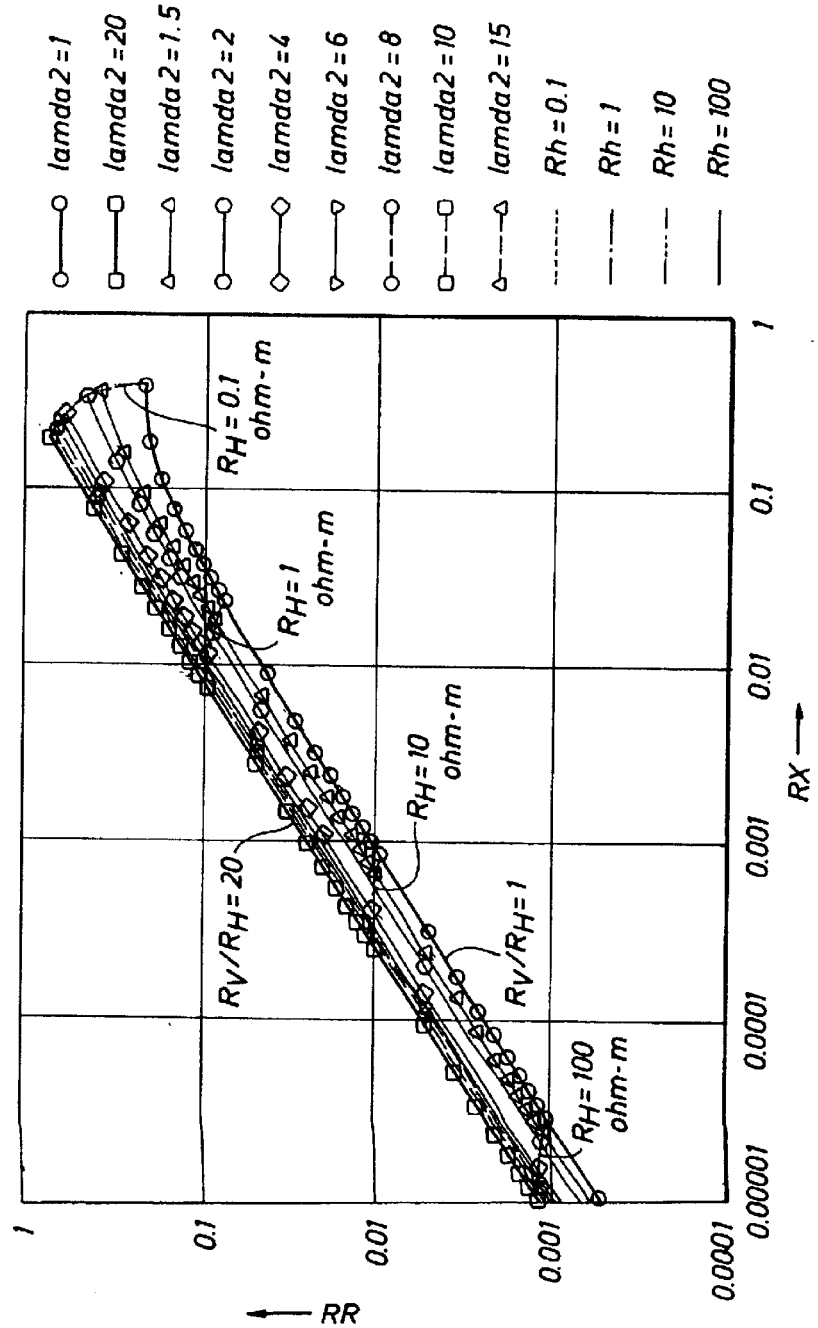

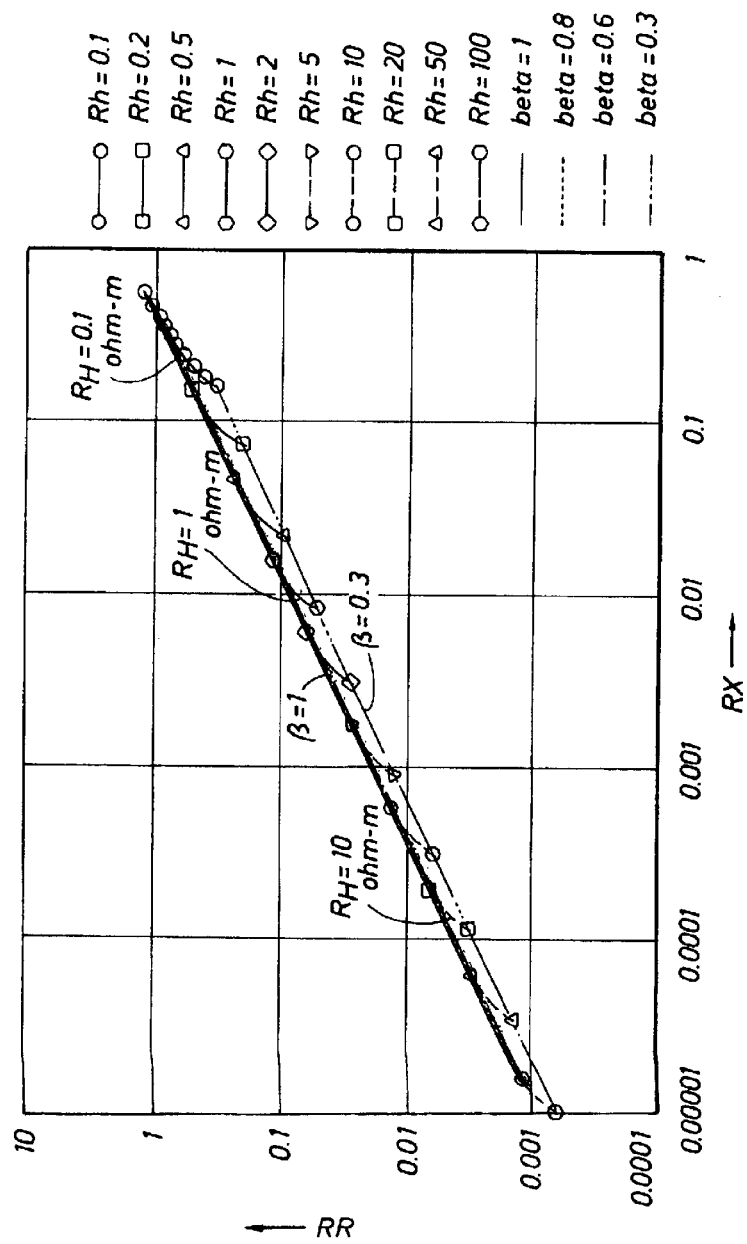

METHOD FOR DETERMINING ANISOTROPIC RESISTIVITY AND DIP ANGLE IN AN EARTH FORMATION

This application claims the benefit of U.S. Provisional Application No. 60/336,996 filed Dec. 3, 2001, the entire disclosure of which is hereby incorporated by reference.

BACKGROUND OF THE INVENTION

1. Field of the Invention

The present invention is related to the field of electromagnetic logging of earth formations penetrated by well borehole. More specifically, the invention is related to a method for determining the anisotropic resistivity properties of the earth formation and the dip angle of the borehole in the earth formation.

2. Description of the Related Art

The basic techniques of electromagnetic or induction logging instruments are well known in the art. A sonde, having at least one transmitter coil and at least one receiver coil, is positioned in a well borehole either on the end of a wireline or as part of a logging while drilling ("LWD"). The axis of the coils is essentially co-linear with the axis of the sonde and borehole. An oscillating signal is transmitted through transmitter coil, which creates a magnetic field in the formation. Eddy currents are induced in the earth formation by the magnetic field, modifying the field characteristics. The magnetic field flows in ground loops essentially perpendicular to the tool axis and is picked up by the receiver coil. The magnetic field induces a voltage in the receiver coil related to the magnitude of the earth formation eddy currents. The voltage signals are directly related to the conductivity of the earth formation, and thereby conversely the formation resistivity. Formation resistivity is of interest in that one may use it to infer the fluid content of the earth formation. Hydrocarbons in the formation, i.e. oil and gas, have a higher resistivity (and lower conductivity) than water or brine.

However, the formation is often not homogeneous in nature. In sedimentary strata, electric current flows more easily in a direction parallel to the strata or bedding planes as opposed to a perpendicular direction. One reason is that mineral crystals having an elongated shape, such as kaolin or mica, orient themselves parallel to the plane of sedimentation. As a result, an earth formation may posses differing resistivity/conductivity characteristics in the horizontal versus vertical direction. This is generally referred to as formation microscopic anisotropy and is a common occurrence in minerals such as shales. The sedimentary layers are often formed as a series of conductive and non-conductive layers. The induction tool response to this type of formation is a function of the conductive layers where the layers are parallel to the flow of the formation eddy currents. The resistivity of the non-conductive layers is represents a small portion of the received signal and the induction tool responds in a manner. However, as noted above, it is the areas of non-conductivity (high resistivity) that are typically of the greatest interest when exploring for hydrocarbons. Thus, conventional induction techniques may overlook areas of interest.

The resistivity of such a layered formation in a direction generally parallel to the bedding planes is referred to as the transverse or horizontal resistivity $R_h$ and its inverse, horizontal conductivity $\sigma_h$. The resistivity of the formation in a directive perpendicular to the bedding planes is referred to as the longitudinal or vertical resistivity $R_v$, with its inverse vertical conductivity $\sigma_v$. The anisotropy coefficient, by definition is:

$$\lambda = \sqrt{R_H/R_V} = \sqrt{\sigma_v/\sigma_h} = \frac{1}{\alpha} \quad [1]$$

Subterranean formations are often made up of a series of relatively thin beds having differing lithological characteristics and resistivities. When the thin individual layers cannot be delineated or resolved by the logging tool, the logging tool responds to the formation as if it were macroscopically anisotropic formation, ignoring the thin layers.

Where the borehole is substantially perpendicular to the formation bedding planes, the induction tool responds primarily to the horizontal components of the formation resistivity. When the borehole intersects the bedding planes at an angle, often referred to as a deviated borehole, the tool will respond to components of both the vertical and horizontal resistivity. With the increase in directional and horizontal drilling, the angle of incidence to the bedding planes can approach 90°. In such instances, the vertical resistivity predominates the tool response. It will be appreciated that since most exploratory wells are drilled vertical to the bedding planes, it may be difficult to correlate induction logging data obtained in highly deviated boreholes with known logging data obtained in vertical holes. This could result in erroneous estimates of formation producibility if the anisotropic effect is not addressed.

A number of techniques and apparatus have been developed to measure formation anisotropy. These techniques have included providing the induction tool with additional transmitter and receiver coils, where the axes of the additional coils are perpendicular to the axes of the conventional transmitter and receiver coils. An example of this type of tool might include U.S. Pat. No. 3,808,520 to Runge, which proposed three mutually orthogonal receiver coils and a single transmitter coil. Other apparatus include the multiple orthogonal transmitter and receiver coils disclosed in U.S. Pat. No. 5,999,883 to Gupta et al. Still other techniques have utilized multiple axial dipole receiving antennae and a single multi-frequency transmitter, or multiple axial transmitters such as those described in U.S. Pat. No. 5,656,930 to Hagiwara and U.S. Pat. No. 6,218,841 to Wu.

SUMMARY OF THE INVENTION

A new method is provided for determining the anisotropic properties of a subterranean earth formation. The present invention is directed to a method for determining the anisotropic properties of an earth formation utilizing a multi-component induction. Specifically, the present invention contemplates a method for inverting the multi-component induction tool responses to determine anisotropic resistivity of an anisotropic and/or homogeneous formation and determine the tool's orientation with respect to the formation anisotropic direction utilizing both the resistive (R) and reactive (X) portions of the signals from a combination of tool responses.

In a preferred implementation, an induction logging tool, having multiple mutually orthogonal transmitter coils and receiver coils, is positioned in a borehole and activated. Power is applied to the transmitter coils to induce eddy currents in the formation. These eddy currents then induce currents in the receiver coils. These are processed to generate a preliminary phase shift derived resistivity and attenuation derived resistivity. This information is then compared with a predetermined model that relates phase shift derived resistivity and attenuation derived resistivity, horizontal resistivity, vertical resistivity and the anisotropy coefficient. Utilizing an inversion technique based on the preexisting model, the horizontal resistivity and vertical resistivity for a formation, as well as anisotropy coefficient and deviation angle relative to the formation, may be readily determined from the logging data.

BRIEF DESCRIPTION OF THE DRAWINGS

A better understanding of the present invention may be had by referencing detailed description together with the Figures, in which:

FIG. 3C is a nomograph depicting a means for determining $R_V/R_H$ as a function of $R_{tt}$;

FIG. 3D is a nomograph depicting a means for determining $R_V/R_H$ as a function of the ratio $R_{tt}/R_{ll}$;

FIG. 4A is a nomograph depicting a means for determining $R_H$ and $R_V$ as a function of $R_{tt}$ and $X_{tt}$;

FIG. 4B is a nomograph depicting a means for determining $R_V/R_H$ as a function of the ratio $R_{tt}/X_{tt}$;

FIG. 5C is a nomograph depicting a means for determining $R_V/R_H$ as a function of $R_{ll}$;

FIG. 5D is a nomograph depicting a means for determining $R_V/R_H$ as a function of $R_{uu}$;

FIG. 5F is a nomograph depicting a means for determining $R_V/R_H$ as a function of the ratio of $R_{uu}/R_{tt}$;

FIG. 6B is a nomograph depicting a means for determining $R_V/R_H$ as a function of the ratio of $X_{ll}/R_{ll}$;

FIG. 6C is a nomograph depicting a means for determining $R_H$ and $R_V$ as a function of $R_{uu}$ and $X_{uu}$;

FIG. 7A is a nomograph depicting a means for determining $R_H$ and $\beta$ as a function of $R_{ll}$ and $X_{ll}$;

DETAILED DESCRIPTION OF THE PREFERRED EMBODIMENT

Figure 1:
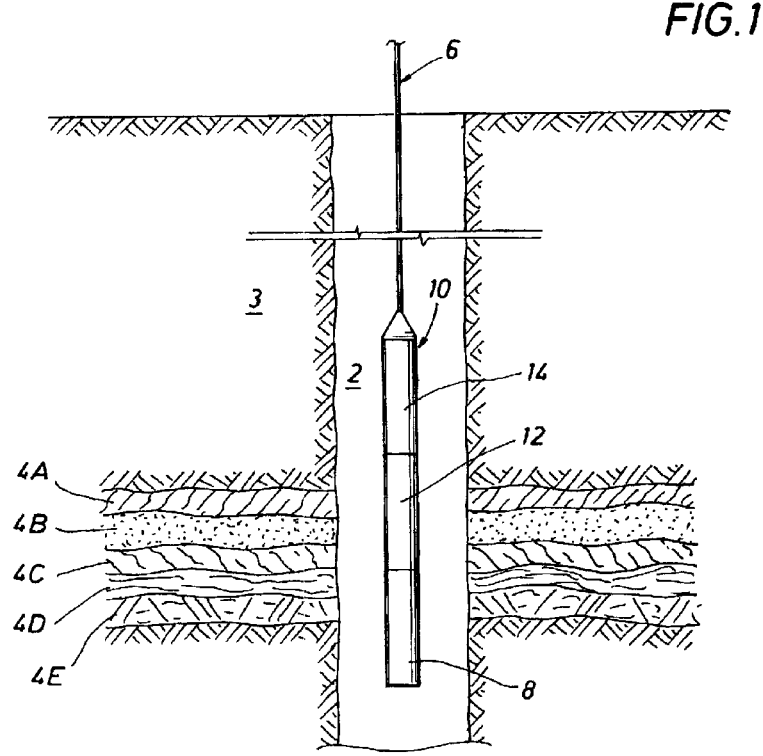
FIG. 1 is simplified depiction of a logging tool that may be used to practice the present invention deployed in an earth borehole.

The present invention is intended to be utilized with a multi-component, i.e., multiple mutually orthogonal transmitters and receiver coils. Exemplary of this type of induction tool is that disclosed in U.S. Pat. No. 5,999,883 to Gupta et al., which is incorporated herein by reference. In FIG. 1, an induction tool 10 is disposed in a wellbore 2 drilled through an earth formation 3. The earth formation 3 is shown as having a zone of interest 4. The tool 10 is lowered into the earth formation 3 to the zone of interest 4 on an armored, multi-conductor cable 6. The cable 6 is further part of a surface system (not shown) which might typically consist of a winch, a surface control system, including one or more surface computers, interface equipment, power supplies and recording equipment. The surface systems of this type might include a mobile truck mounted unit or a skid mounted unit for offshore operations. Further, the tool 10 may be transported utilizing other techniques, such as coiled tubing having power and data communications capability or as part of a drilling string in a Logging While Drilling (LWD) suite of tools.

The tool 10 is comprised of three subsections including an electronics section 14, a coil mandrel unit 8, and a receiver/processing telemetry section 12 that is in communication with the cable 6. The coil mandrel section 8 includes the transmitter coils for inducing an electromagnetic field in the earth formation in the zone of interest 4 upon application of power and the receiving coils for picking up signals created by induced eddy currents characteristic is the zone of interest 4. The electronics section 14 include the signal generator and power systems to apply the current to the transmitter coils. The tool 10 is shown as being disposed adjacent to a zone of interest 4 that is made up of thin formation sections 4A–4E.

It should be noted that while FIG. 1 depicts the tool 10 as being lowered in a vertical borehole 2, that current drilling techniques commonly result in a borehole which deviates several times along its length from the true vertical position. Accordingly, a borehole may intersect a zone of interest at an angle and could greatly affect the tool's measurement of resistivity characteristics. The preferred method of the present invention is designed to address this problem.

1. Relation of Tool, Borehole and Formation Coordinate Systems

A multi-component induction tool such as that disclosed in U.S. Pat. No. 5,999,883 consists of at least three mutually orthogonal loop antenna transmitters ($M_l$, $M_m$, $M_n$) and at least three mutually orthogonal receiver coils whose responses are proportional to the magnetic field strength vectors ($H_l$, $H_m$, $H_n$), where l, m, and n denote a common coordinate system. It should be noted that the in-phase R-signal is proportional to the imaginary part of the H field. The three transmitters are set at the same position longitudinally along the tool 10 axis, which coincides with the l-axis of the coordinate system. The three receivers are also grouped at a common position spaced away from the transmitters along the l-axis. The two transverse directions are along the m- and n-axes.

With this arrangement, there exist nine different complex voltage measurements proportional to the magnetic field strength vector at the receiver loop antennas when the transmitters are activated:

($H_{ll}$, $H_{ml}$, $H_{nl}$) from transmitter $M_l$;

($H_{lm}$, $H_{mm}$, $H_{nm}$) from transmitter $M_m$; and ($H_{ln}$, $H_{mn}$, $H_{nn}$) from transmitter $M_n$.

However, as a matter of reciprocity, $H_{nl}=H_{ln}$; $H_{mn}=H_{nm}$; and $H_{ml}=H_{lm}$. Accordingly, there are six independent measurements, which can be expressed as:

$$H^{tool} = \begin{bmatrix} H_{ll} & H_{lm} & H_{ln} \\ H_{ml} & H_{mm} & H_{mn} \\ H_{nl} & H_{nm} & H_{nn} \end{bmatrix} = \begin{bmatrix} H_{ll} & H_{lm} & H_{ln} \\ H_{lm} & H_{mm} & H_{mn} \\ H_{ln} & H_{mn} & H_{nn} \end{bmatrix} \quad [2]$$

One starts with the assumption that formations 4A–4E of FIG. 1 are layered horizontally, where the true vertical direction is z-axis. A formation will be said to exhibit anisotropy where the resistivity in the vertical direction is different from that in the horizontal direction. The formation conductivity tensor is characterized by two anisotropic conductivity values:

$$\sigma = \begin{bmatrix} \sigma_{zz} & \sigma_{xy} & \sigma_{zy} \\ \sigma_{xz} & \sigma_{xx} & \sigma_{xy} \\ \sigma_{yz} & \sigma_{yx} & \sigma_{yy} \end{bmatrix} = \begin{bmatrix} \sigma_V & 0 & 0 \\ 0 & \sigma_H & 0 \\ 0 & 0 & \sigma_H \end{bmatrix} \quad [3]$$

where $\sigma_H$ is the horizontal conductivity and $\sigma_V$ is the vertical conductivity of the formation. The formation coordinates system in this instance is (z, x, y). Where the coordinate system of the tool (l, m, n) is aligned with the coordinate system of the formation (z, x, y), the magnetic field strength in the formation can be expressed as:

$$H^{formation} = \begin{bmatrix} H_{zz} & H_{zx} & H_{zy} \\ H_{xz} & H_{xx} & H_{xy} \\ H_{yz} & H_{yx} & H_{yy} \end{bmatrix} \quad [4]$$

However, as noted above, the borehole is rarely vertical, meaning the coordinate systems rarely align. This represents a deviation angle of θ. The borehole itself may be considered to have a coordinate system (l, t, u) where the u-axis coincides with the formation's y-axis. See FIG. 3. The borehole coordinate system and the formation coordinate system are related by a rotational operation around the y-axis by an inclination angle θ about the y-axis:

$$\begin{bmatrix} \hat{l} \\ \hat{t} \\ \hat{u} \end{bmatrix} = \begin{bmatrix} \cos\theta & \sin\theta & 0 \\ -\sin\theta & \cos\theta & 0 \\ 0 & 0 & 1 \end{bmatrix} \begin{bmatrix} \hat{z} \\ \hat{x} \\ \hat{y} \end{bmatrix} = R_y(\theta) \begin{bmatrix} \hat{z} \\ \hat{x} \\ \hat{y} \end{bmatrix} \quad [5]$$

where $R_y$ is the rotational operator for angle θ.

Presuming that the longitudinal axis of the tool is aligned with the borehole coordinate system, then it may be stated that the antenna coordinate system (l, m, n) is aligned with the borehole coordinate system (l, t, u) and $$H^{borehole} = \begin{bmatrix} H_{ll} & H_{xy} & H_{xz} \\ H_{yx} & H_{yy} & H_{yz} \\ H_{zx} & H_{zy} & H_{zz} \end{bmatrix} \quad [6]$$

Moreover, $H^{borehole}$ and $H^{formation}$ are related by the rotational factor:

$$\begin{bmatrix} H_{ll} & H_{lt} & H_{lu} \\ H_{tl} & H_{tt} & H_{tu} \\ H_{ul} & H_{ut} & H_{uu} \end{bmatrix} = R_y(\theta) \begin{bmatrix} H_{zz} & H_{zx} & H_{zy} \\ H_{xz} & H_{xx} & H_{xy} \\ H_{yz} & H_{yx} & H_{yy} \end{bmatrix} R_y(\theta)^{tr} \quad [7]$$

Where $R_y(\theta)^{tr}$ is the transposition of $R_y(\theta)$.

However it is rare that the coordinate system (l, m, n) of the tool antennae is aligned with the borehole coordinate system (l, t, u). Accordingly, the transverse (m, n) tool coordinates are related to the borehole coordinates (t, u) be a rotational operation about the l-axis by an azimuthal angle φ:

$$\begin{bmatrix} \hat{l} \\ \hat{m} \\ \hat{n} \end{bmatrix} = \begin{bmatrix} 1 & 0 & 0 \\ 0 & \cos\varphi & \sin\varphi \\ 0 & -\sin\varphi & \cos\varphi \end{bmatrix} \begin{bmatrix} \hat{l} \\ \hat{t} \\ \hat{u} \end{bmatrix} = R_l(\theta) \begin{bmatrix} \hat{l} \\ \hat{t} \\ \hat{u} \end{bmatrix} \quad [8]$$

The tool response $H^{tool}$ is then related to the borehole response $H^{borehole}$ be the operator $$\begin{bmatrix} H_{ll} & H_{lt} & H_{lu} \\ H_{tl} & H_{tt} & H_{tu} \\ H_{ul} & H_{ut} & H_{uu} \end{bmatrix} = R_l(\theta)^{tr} \begin{bmatrix} H_{ll} & H_{lm} & H_{ln} \\ H_{ml} & H_{mm} & H_{mn} \\ H_{nl} & H_{nm} & H_{nn} \end{bmatrix} R_l(\varphi) \quad [9]$$

where $R_l(\phi)^{tr}$ is defined as the transposition of $R_l(\phi)$.

2. Tool Response

Having defined the coordinate systems for the tool, borehole and formation, the tool response may now be expressed in terms of the formation coordinate system (z, x, y), where the tool (l, m, n) directions are aligned with the formation. At a tool transmitter, the fields in the formation can be described per Moran/Gianzero (J. H. Moran and S. C. Gianzero, "Effects of Formation Anisotropy on Resistivity Logging Measurements", Geophysics (1979) 44, p. 1266) as follows:

$$H_{zz} = \frac{M_z}{4\pi}\left\{(3(1-u)+u^2)\frac{z^2}{r^2} - (1-u+u^2)\right\}\frac{e^u}{r^3} \quad [10]$$

$$H_{zx} = \frac{M_z}{4\pi}\left\{(3(1-u)+u^2)\frac{xz}{r^2}\right\}\frac{e^u}{r^3} \quad [11]$$

$$H_{xx} = \frac{M_x}{4\pi}\left\{(3(1-u)+u^2)\frac{x^2}{r^2} - (1-u+u^2)\right\}\frac{e^u}{r^3} + I_0 \quad [12]$$

$$H_{yy} = \frac{M_y}{4\pi}\{-(1-u+u^2)\}\frac{e^u}{r^3} - I_0 + I_1 \quad [13]$$

$$H_{yz} = 0 \quad [14]$$

$$H_{yx} = 0 \quad [15]$$

where $$u = ik_H r \quad [16]$$

and $k_H$ is the frequency of the magnetic moment induced and r is $$r = \sqrt{x^2+y^2+z^2}; \text{ and } \rho = \sqrt{x^2+y^2}.$$

The receiver coils are also presumed to be located relative to the formation coordinate system (z, x, y)=(Lcosθ, Lsinθ, 0), where θ is again the deviation angle. The currents induced in the receiver coils may be expressed as:

$$I_0 = \frac{M_z}{4\pi}\left\{\frac{u}{r}(e^u - e^{u\beta})\right\}\frac{1}{\rho^2} = \frac{M_z}{4\pi}\frac{e^u}{r^3}\left\{\frac{u}{\sin^2\theta}(1-e^{u(\beta-1)})\right\} = \frac{M_z}{4\pi}\frac{e^u}{r^3}\tilde{I}_0 \quad [17]$$

$$I_1 = \frac{M_z}{4\pi}\frac{e^u}{r^3}u^2\left(1 - \frac{\alpha^2}{\beta}e^{u(\beta-1)}\right) = \frac{M_z}{4\pi}\frac{e^u}{r^3}\tilde{I}_1 \quad [18]$$

where α is the inverse of λ and β is the anisotropy factor $\beta = \sqrt{1+(\alpha^2-1)\sin^2\theta}$, r=L, and ρ=Lsinθ. It should be noted that in this instance u is a function of only the horizontal resistivity. Both $I_0$ and $I_1$ are dependent on u, β and θ. If all of the transmitters are set at equal transmission power ($M_1=M_u=M_t=M_0$), then the tool response in the borehole can be written as:

$$H_{ll} = \frac{M_0}{4\pi} \frac{e^u}{r^3} \{2(1-u) + u(1-e^{u(\beta-1)})\} \quad [19]$$

$$H_{tt} = \frac{M_0}{4\pi} \frac{e^u}{r^3} \left\{-(1-u+u^2) + u\frac{\cos^2\theta}{\sin^2\theta}(1-e^{u(\beta-1)})\right\} \quad [20]$$

$$H_{lt} = \frac{M_0}{4\pi} \frac{e^u}{r^3} \left\{u\frac{\cos\theta}{\sin\theta}(1-e^{u(\beta-1)})\right\} \quad [21]$$

$$H_{uu} = \frac{M_0}{4\pi} \frac{e^u}{r^3} \left\{-(1-u+u^2) - \frac{u}{\sin^2\theta}(1-e^{u(\beta-1)}) + u^2\left(1-\frac{\alpha^2}{\beta}e^{u(\beta-1)}\right)\right\} \quad [22]$$

$$H_{ul}=0 \quad [23]$$

$$H_{ut}=0 \quad [24]$$

This results in three unknowns that characterize the formations anisotropic resistivity, $R_H$, $R_V$, and the deviation angle θ. Note that $H_{ll}$ depends only on u (hence $R_H$) and β, only. The remainder of the responses, $H_{tt}$, $H_{lt}$, $H_{uu}$ depend on the variables u, β, and θ.

3. Azimuthal Correction for Deviated Boreholes

In deviated boreholes, the azimuthal rotation of the tool in the borehole must be determined. In actual logging, the tool's azimuthal orientation is not known. The directions of two transversally oriented antennas do not coincide with the l- and u-axis directions. The multi-component induction tool measures $H^{tool}$ that is different from $H^{borehole}$.

In a longitudinally anisotropic formation, the orthogonality condition holds as $H_{yz}=H_{yx}=0$. This implies $H_{ul}=H_{ut}=0$. As a result, not all six measurements of $H^{tool}$ are independent, and ($H_{lm}$, $H_{ln}$, $H_{mm}$, $H_{nn}$, $H_{mn}$) must satisfy the following consistency condition:

$$H_{mn} = \frac{(H_{mm} - H_{nn})H_{lm}H_{ln}}{(H_{lm}^2 - H_{ln}^2)} \quad [25]$$

The azimuthal angle θ is determined either from ($H_{lm}$, $H_{ln}$) by, $$\tan\varphi = -\frac{H_{ln}}{H_{lm}} \quad [26]$$

$$\cos\varphi = \frac{H_{lm}}{\sqrt{H_{lm}^2 + H_{ln}^2}} \quad [27]$$

$$\sin\varphi = -\frac{H_{ln}}{\sqrt{H_{lm}^2 + H_{ln}^2}} \quad [28]$$

or from ($H_{mm}$, $H_{nn}$, $H_{mn}$) by, $$\tan 2\varphi = -\frac{2H_{mn}}{H_{mm}-H_{nn}} = \frac{2\tan\varphi}{1-\tan^2\varphi} \quad [29]$$

If all of the ($H_{lm}$, $H_{ln}$, $H_{mm}$, $H_{nn}$, $H_{mn}$) measurements are available, the azimuthal angle φ may be determined by minimizing the error, $$\text{error} = |H_{lm}\sin\varphi + H_{ln}\cos\varphi|^2 + \left|\frac{H_{mm}-H_{nn}}{2}\sin 2\varphi + H_{mn}\cos 2\varphi\right|^2 \quad [30]$$

The $H^{borehole}$ is calculated in terms of $H^{tool}$ by, $$H_{ll} = \sqrt{H_{lm}^2 + H_{ln}^2} \quad [31]$$

$$H_{tt} = \frac{H_{mm}H_{lm}^2 - H_{nn}H_{ln}^2}{H_{lm}^2 - H_{ln}^2} \quad [32]$$

$$H_{uu} = \frac{H_{nn}H_{lm}^2 - H_{mm}H_{ln}^2}{H_{lm}^2 - H_{ln}^2} \quad [33]$$

These should be used in determining the $R_H$, $R_V$, and θ, from the multi-component induction tool measurements $H^{tool}$.

4. Inversion of Multi-Component Induction Resistivity Data

The present invention utilizes an inversion technique to determine anisotropic resistivity characteristics over a range of deviation angles. Where the tool is placed in vertical borehole (θ=0), there exist two independent measurements, each independent measurement being composed of an H field having both an in-phase and out-phase component.

$$H_{ll} = \frac{M_0}{4\pi} \frac{e^u}{r^3} \{2(1-u)\} \quad [34]$$

$$H_{tt} = \frac{M_0}{4\pi} \frac{e^u}{r^3} \left\{-\left(1-u+u^2\frac{\alpha^2+1}{2}\right)\right\} \quad [35]$$

$$H_{lt}=0 \quad [36]$$

$$H_{uu}=H_{tt} \quad [37]$$

This means that $H_{ll}$ is a function solely of u, hence the horizontal resistivity. $H_{tt}=H_{uu}$ which means both are a function of u and anisotropy $\lambda^2=R_H/R_V$, i.e., a function of both the horizontal and vertical resistivity.

Figure 3A:
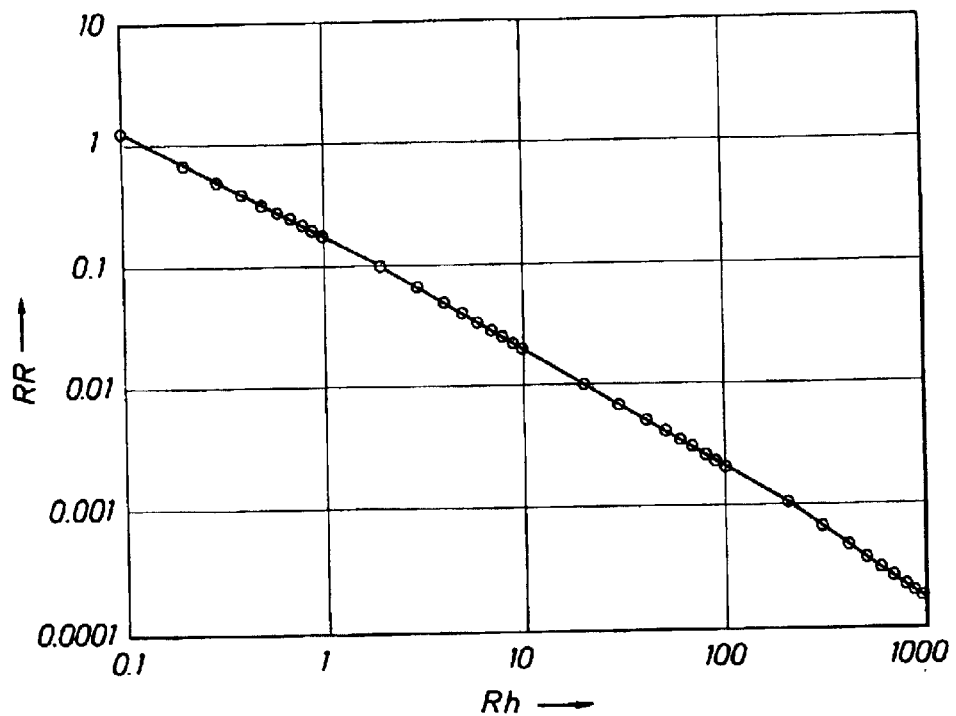
FIG. 3A is a nomograph depicting a means for determining $R_H$ as a function of $R_{ll}$.
Figure 3B:
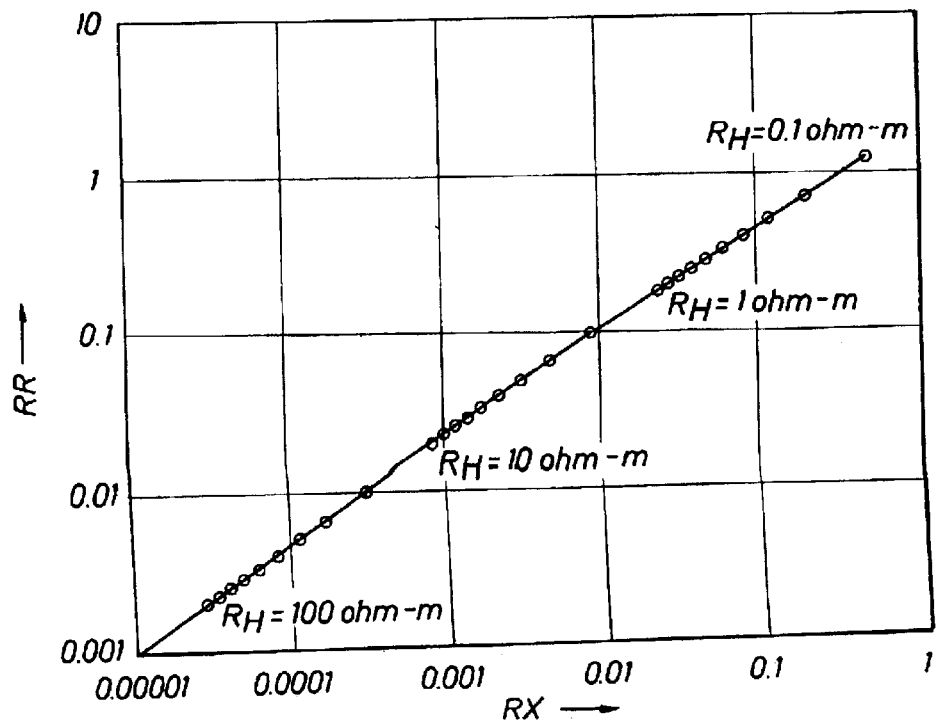
FIG. 3B is a nomograph depicting a means for determining $R_H$ as a function of $R_{ll}$ and $X_{ll}$.

FIG. 3A demonstrates the relationship between the relationship between the R-signal and the formation horizontal resistivity $R_H$. This relationship may be used to invert the conventional R signal to obtain apparent $R_H$. When using both the resistive R and reactive X components of the signal measured as part of $H_{ll}$, the graph set forth in FIG. 3B may be used to determine $R_H$. This is done by minimizing the model error as follows:

$$\text{error} = \left|H_{ll}^{measured} - \frac{M_0}{4\pi} \frac{e^u}{r^3}\{2[1-u]\}\right|^2 \quad [38]$$

Once $R_H$ is determined from the above, the vertical resistivity $R_V$ can be determined from the $H_{ll}$ measurement. One means of doing so is to determine the ratio $R_H/R_V$ as a function of the R-signal as set forth in FIG. 3C. An alternative means of doing so would be based on the ratio of the measured $H_{tt}/H_{ll}$, ratio based again on the resistive component of the signal R, i.e., $R_{tt}/R_{ll}$, as demonstrated in FIG. 3D.

An alternative means of determining horizontal and vertical resistivity may be accomplished utilizing both the resistive and reactive portions of the received signal from $H_{tt}$. FIG. 4A is a nomograph showing differing ratios of anisotropic resistivity values $R_H$, $R_V$ (in this instance, as a function of λ, the square root of $R_H/R_V$). Both $R_H$ and $R_V$ can be determined simultaneously by minimizing the error as follows:

$$\text{error} = \left| H_{tt}^{measured} + \frac{M_0}{4\pi} \frac{e^u}{r^3} \left[ 1 - u + u^2 \frac{\alpha^2 + 1}{2} \right] \right|^2 \quad [39]$$

An alternative means to determine $R_H$ and $R_V$ is shown in nomograph of FIG. 4B, which shows $R_V/R_H$ as a function of both the R and X signals from $H_{tt}$. Both $R_H$ and $R_V$ can be determined simultaneously by again minimizing Eq. 29.

When the tool records R- and X-signals for both $H_{ll}$ and $H_{tt}$, $R_H$ and $R_V$ can be determined simultaneously by minimizing the error:

$$\text{error} = \left| H_{ll}^{measured} - \frac{M_0}{4\pi} \frac{e^u}{r^3} \{2[1-u]\} \right|^2 + \left| H_{tt}^{measured} + \frac{M_0}{4\pi} \frac{e^u}{r^3} \left[ 1 - u + u^2 \frac{\alpha^2 + 1}{1} \right] \right|^2 \quad [40]$$

As noted previously, it is rare in current drilling and logging practice that a well is drilled vertical. At the opposite end of the spectrum is a determination of anisotropic resistivity characteristics when the borehole is essentially horizontal ($\theta = 90°$). Equations 19–24 reduce to three independent measurements, each with a resistive and reactive component:

$$H_{ll} = \frac{M_0}{4\pi} \frac{e^u}{r^3} \{2(1-u) + u(1 - e^{u(\alpha-1)})\} \quad [41]$$

$$H_{tt} = \frac{M_0}{4\pi} \frac{e^u}{r^3} \{-(1 - u + u^2)\} \quad [42]$$

$$H_{uu} = \frac{M_0}{4\pi} \frac{e^u}{r^3} \{-(1 - u + u^2) - u(1 - e^{u(\alpha-1)}) + u^2(1 - \alpha e^{u(\alpha-1)})\} \quad [43]$$

$$H_{lt} = H_{ul} = H_{ut} = 0 \quad [44]$$

Herein, $H_{tt}$ is a function solely of u, and hence is a function solely of horizontal resistivity $R_H$. $H_{tt}$ and $H_{uu}$ are both a function of variables u and $\alpha$, i.e., u and $R_H$ and $R_V$.

Figure 5A:
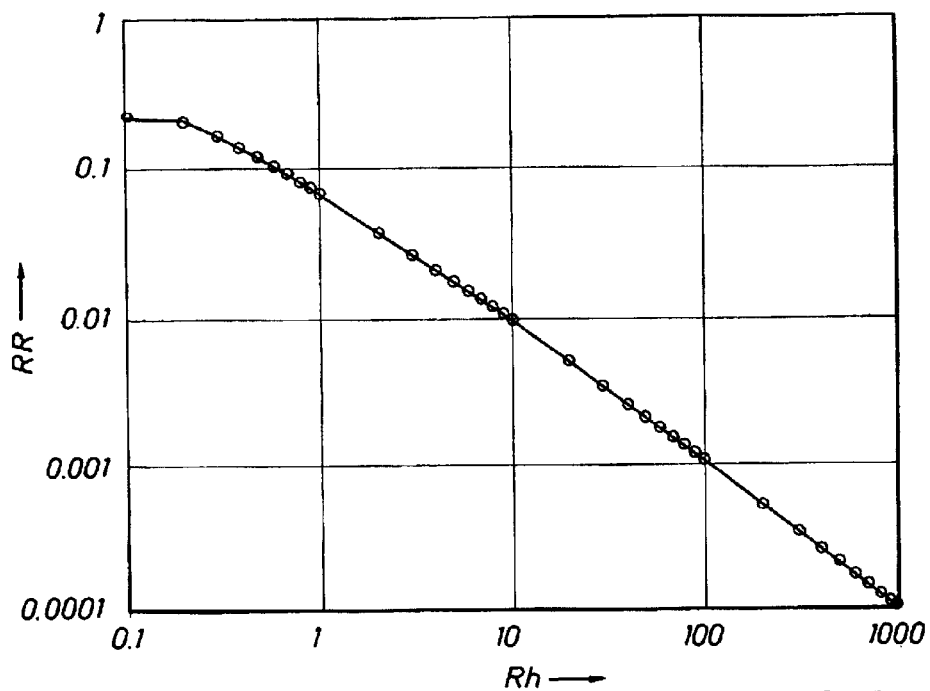
FIG. 5A is a nomograph depicting a means for determining $R_H$ as a function $R_{tt}$.
Figure 5B:
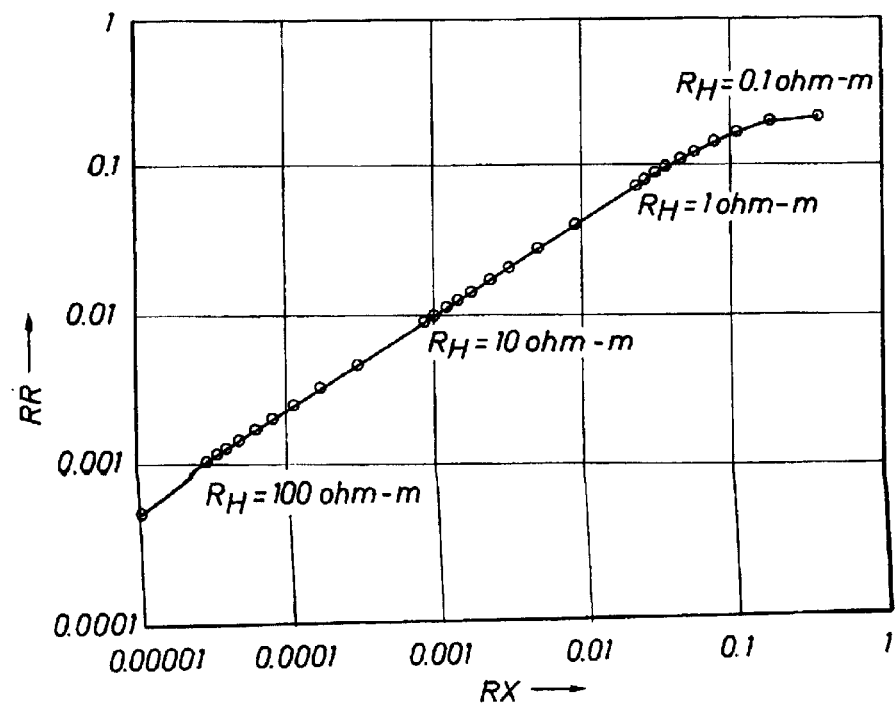
FIG. 5B is a nomograph depicting a means for determining $R_H$ as a function of $R_{tt}$ and $X_{tt}$.

FIG. 5A is a nomograph that relates the R signal from $H_{tt}$ to the horizontal resistivity $R_H$. This may be used to invert the R signal to the apparent formation resistivity. Where R and X signals are available for $H_{tt}$, they may also be used to obtain a formation horizontal resistivity for differing $R_H$ as shown in nomograph 5B. This is accomplished my minimizing the error function:

$$\text{error} = \left| H_{tt}^{measured} + \frac{M_0}{4\pi} \frac{e^u}{r^3} \{1 - u + u^2\} \right|^2 \quad [45]$$

Figure 5E:
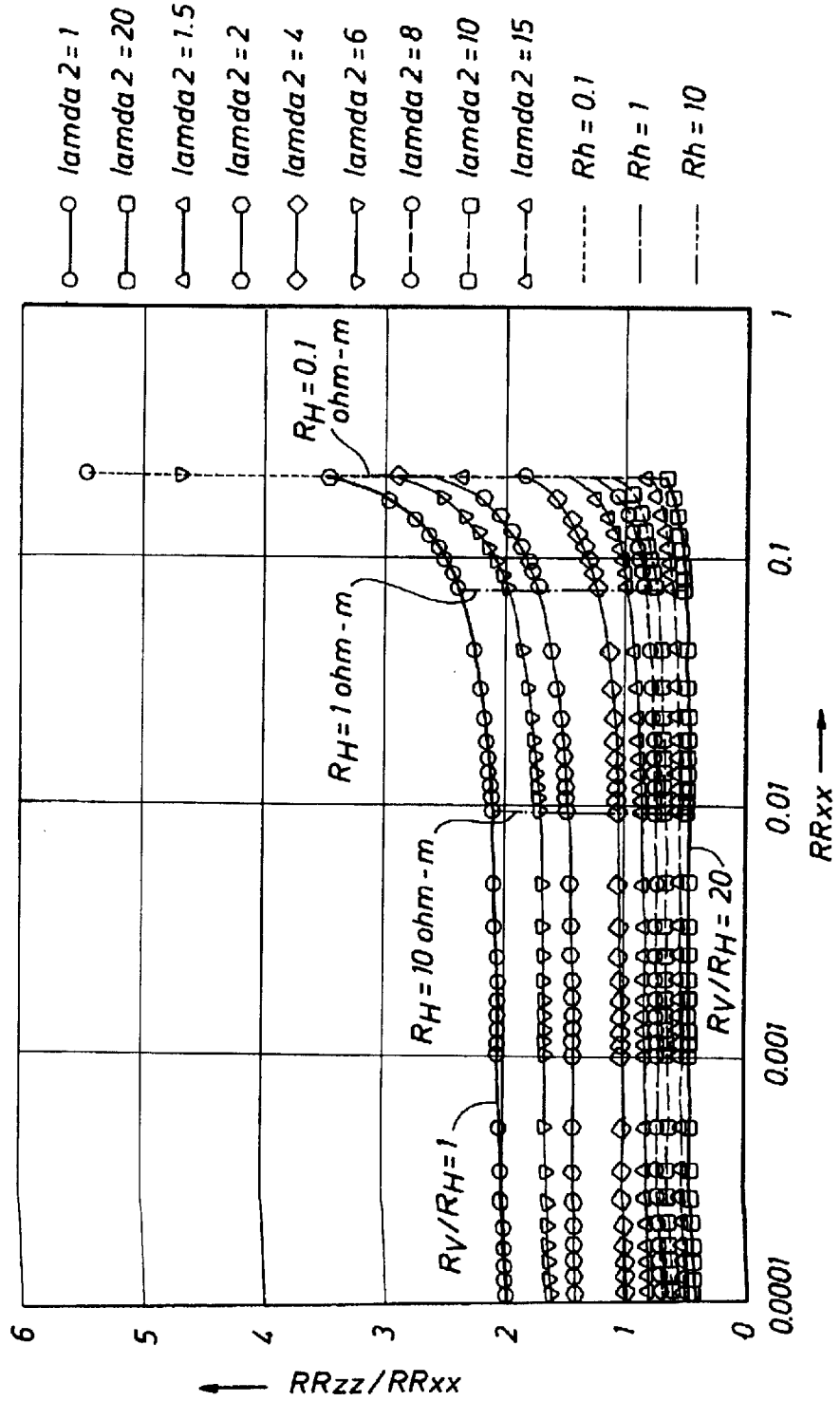
FIG. 5E is a nomograph depicting a means for determining $R_V/R_H$ as a function of the ratio of $R_{ll}/R_{tt}$.

Once the $R_H$ is determined by either method above, the anisotropy and the vertical resistivity can be determined from various signals based on the $H_{ll}$ measurement. The anisotropy $R_V/R_H$ may be obtained from the R signal based on the $H_{ll}$ measurement as shown in FIG. 5C. Alternatively, the anisotropy $R_V/R_H$ may be obtained as a function of the R signal from $H_{uu}$ as shown in FIG. 5D. It should be noted that a determination using FIG. 5D is more highly dependent on $R_H$ as opposed to $R_V$ at high ohm-m resistivities. A more accurate determination of $R_V/R_H$ may be made as a ratio of the R signals from $H_{uu}/H_{ll}$ as demonstrated in FIG. 5E. Another inversion that is useful only at low resistivities is depicted in FIG. 5E which attempts to derive $R_V/R_H$ as a function of the ratio R signals received an antennae $H_{uu}/H_{tt}$.

Figure 6A:
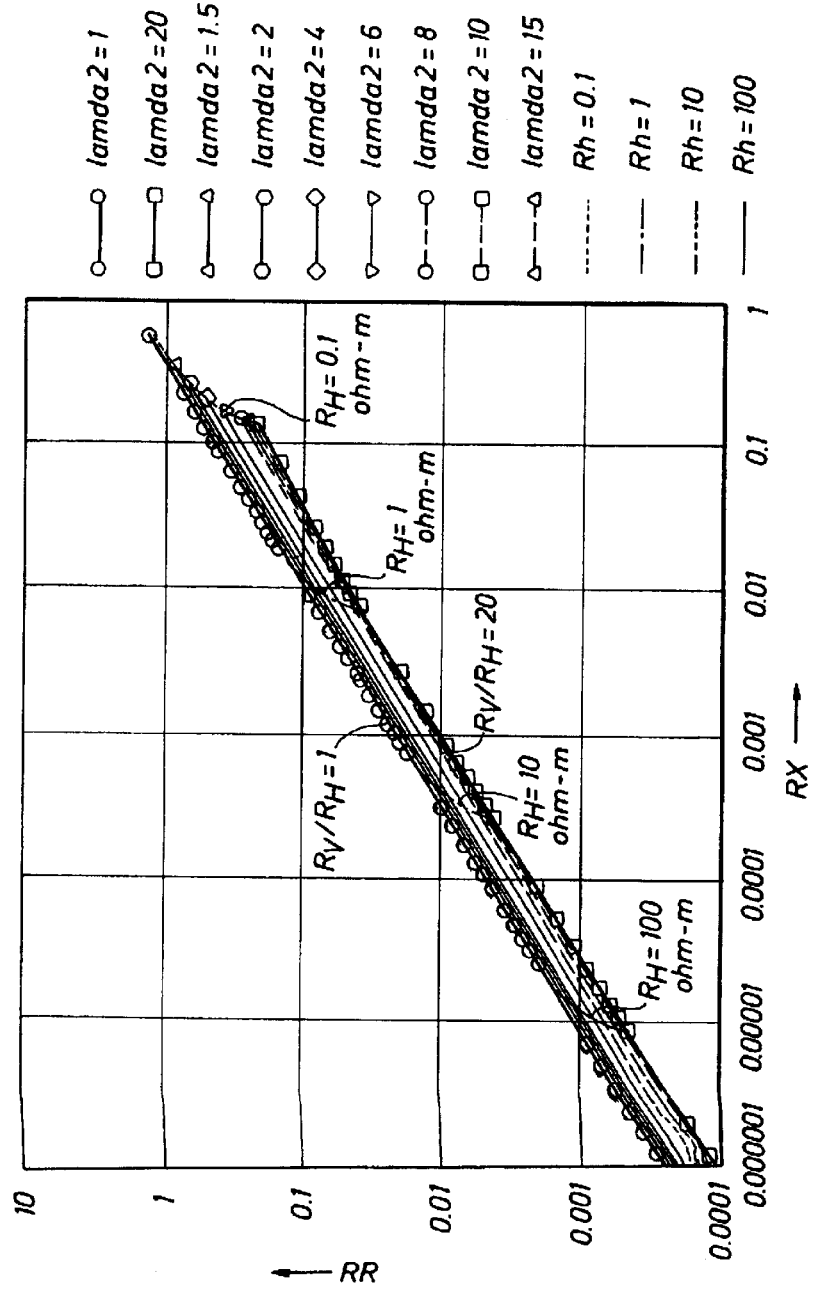
FIG. 6A is a nomograph depicting a means for determining $R_H$ and $R_V$ as a function of $R_{ll}$ and $X_{ll}$.

In the preferred method of the present invention, both the R and X signals are used to determine $R_H$ and $R_V$ simultaneously. In the nomograph of FIG. 6A, $R_V$ and $R_H$ are determined as a function of the ratio of the R/X signals at $H_{ll}$ is obtained for differing anisotropic values. $R_H$ and $R_V$ may be determined by minimizing the error function:

$$\text{error} = \left| H_{ll}^{measured} - \frac{M_0}{4\pi} \frac{e^u}{r^3} \{2[1-u] + u(1 - e^{u(\alpha-1)})\} \right|^2 \quad [46]$$

However, the ratio of $R_V/R_H$ may be better determined from the ratio X/R signals received at $H_{ll}$ as demonstrated in FIG. 6B. As in FIG. 6A, one may determined $R_V$ and $R_H$ for differing anisotropy values based on the ratio of the R/X signals received at $H_{uu}$, as shown in FIG. 6C and then minimizing the following error function to determine $R_V$ and $R_H$:

$$\text{error} = \left| H_{uu}^{measured} - \frac{M_0}{4\pi} \frac{e^u}{r^3} \{-[1 - u + u^2] - u(1 - e^{u(\alpha-1)}) + u^2(1 - \alpha e^{u(\alpha-1)})\} \right|^2 \quad [47]$$

Figure 6D:
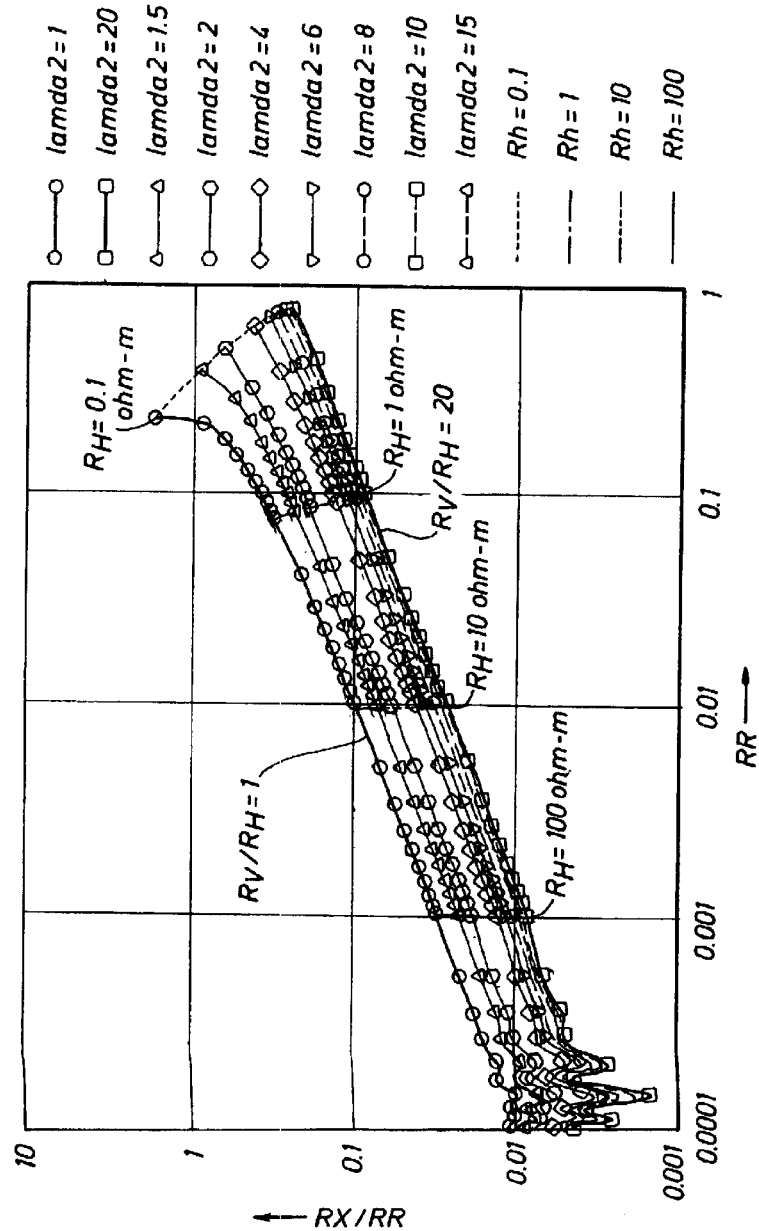
FIG. 6D is a nomograph depicting a means for determining $R_V/R_H$ as a function of the ratio of $X_{uu}/R_{uu}$.

As with the signals received at $H_{ll}$, a better determination of the ratio $R_V/R_H$ may be made with respect to anisotropy values based on the ratio of X/R signals received at $H_{uu}$ as demonstrated in FIG. 6D and then applying the error function.

When both R and X signals are available from all antennae locations $H_{ll}$, $H_{uu}$, and $H_{tt}$, $R_H$ and $R_V$ may be determined simultaneously with greater accuracy by minimizing the error function:

$$\text{error} = \left| H_{tt}^{measured} + \frac{M_0}{4\pi} \frac{e^u}{r^3} \{1 - u + u^2\} \right|^2 + \left| H_{ll}^{measured} - \frac{M_0}{4\pi} \frac{e^u}{r^3} \{2[1-u] + u(1 - e^{u(\beta-1)})\} \right|^2 + \left| H_{uu}^{measured} - \frac{M_0}{4\pi} \frac{e^u}{r^3} \{-[1 - u + u^2] - u(1 - e^{u(\alpha-1)}) + u^2(1 - \alpha e^{u(\beta-1)})\} \right|^2 \quad [48]$$

The two above methods address determination of $R_H$ and $R_V$ at the most extreme cases, i.e. $\theta=0°$ or $90°$. More often than not, the deviation angle for the borehole will be somewhere within this range. The above method for determining the formation vertical and horizontal resistivities may be used where the deviation angle is less than $30°$. However the effect of the deviation angle becomes significant for values above $30°$. In which instance, the full form of Eqs. 19–24 must be used:

$$H_{ll} = \frac{M_0}{4\pi} \frac{e^u}{r^3} \{2[1-u] + u(1 - e^{u(\beta-1)})\}$$

$$H_{tt} = \frac{M_0}{4\pi} \frac{e^u}{r^3} \left\{ -[1 - u + u^2] + u\frac{\cos^2\theta}{\sin^2\theta}(1 - e^{u(\beta-1)}) \right\}$$

$$H_{lt} = \frac{M_0}{4\pi} \frac{e^u}{r^3} \left\{ u\frac{\cos\theta}{\sin\theta}(1 - e^{u(\beta-1)}) \right\}$$

$$H_{uu} = \frac{M_0}{4\pi} \frac{e^u}{r^3} \left\{ -[1 - u + u^2] - \frac{u}{\sin^2\theta}(1 - e^{u(\beta-1)}) + u^2\left(1 - \frac{\alpha^2}{\beta} e^{u(\beta-1)}\right) \right\}$$

$$H_{ul} = H_{ut} = 0$$

There are three variables that characterize the formation's anisotropic characteristics. $H_{ll}$ depends only on u (hence, $R_H$) and $\beta$, whereas, $H_{tt}$, $H_{lt}$, and $H_{uu}$ are all dependent on u, $\beta$, and $\theta$. Herein there are four independent measurements, each having an R and X component, for this overly constrained model.

Using both the R and X signals from $H_{ll}$ can be used to determine u (or $R_H$) and $\beta$, if both $\theta$ (recalling that $\beta = \sqrt{\cos^2\theta + \alpha^2 \sin^2\theta}$ and as $\theta \to 90°$, $\beta \to \alpha$) and $R_V/R_H$ are large. This relationship is demonstrated in nomograph FIG. 7A, from which one may determining $R_H$ and $\beta$ as a function of the R and X signals from $H_{ll}$ for varying $R_H$ and $\beta$. $R_H$ and $\beta$ may also be determined from the R and X signals of $H_{ll}$ by minimization of the error function:

$$\text{error} = \left| H_{ll} - \frac{M_0}{4\pi} \frac{e^u}{r^3} \{2[1-u] + u(1-e^{u(\beta-1)})\} \right|^2 \quad [49]$$

Figure 7B:
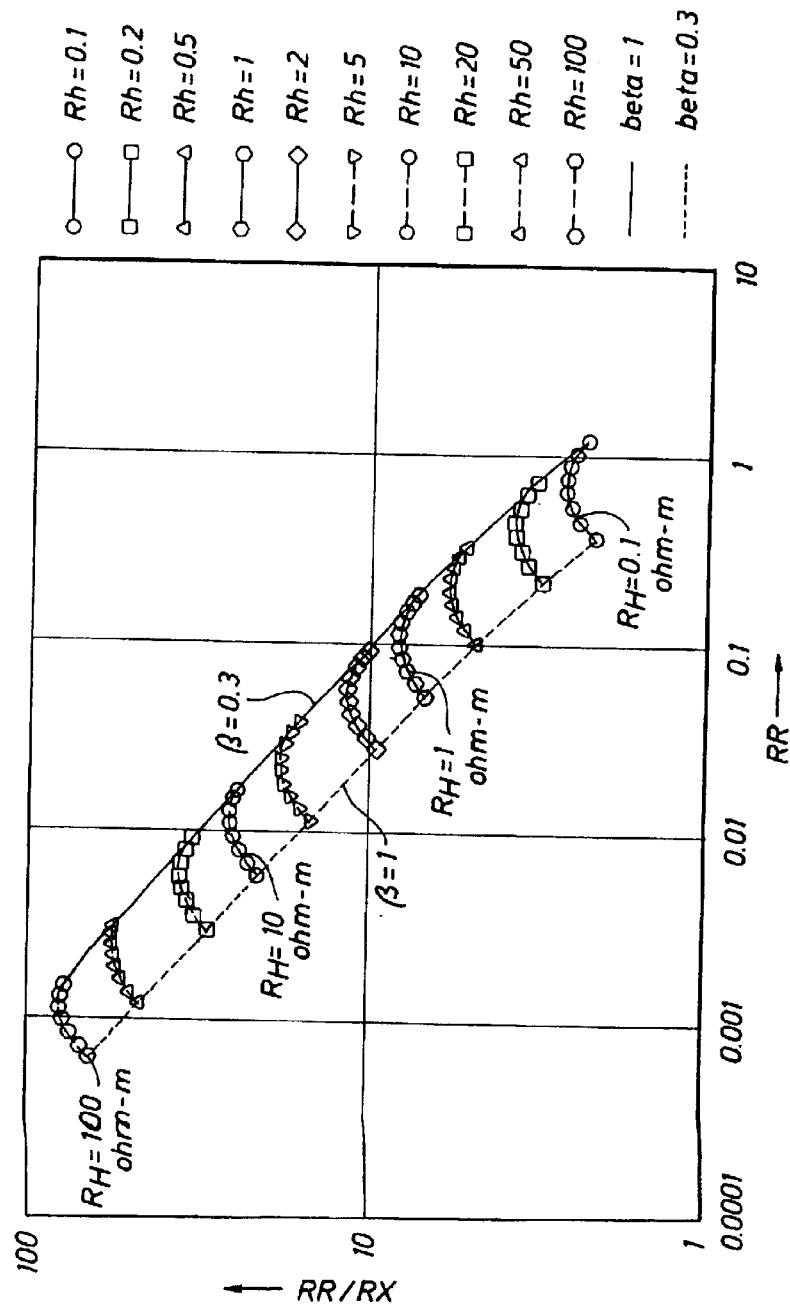
FIG. 7B is a nomograph depicting a means for determining $R_H$ as a function of the ratio of $R_{ll}/X_{ll}$.

Alternatively, $R_H$ may be determined from the ratio of the R/X signals at $H_{ll}$ as shown in nomograph FIG. 7A. Upon determining $R_H$ (or u) and $\beta$, the may be substituted into Eqs. 20–22 to determine the remaining two variables, $R_V$ and $\theta$. Thus, one can determine the horizontal and vertical resistivities, $R_H$ and $R_V$, without prior knowledge of the deviation angle $\theta$, which may be independently determined.

When R and X signals are available from $H_{ll}$, $H_{tt}$, $H_{lt}$, and $H_{uu}$, then $R_H$ and $R_V$ and $\theta$ may be determined by minimizing the error function:

$$\text{error} = \left| H_{ll}^{measured} - \frac{M_0}{4\pi} \frac{e^u}{r^3} \{2[1-u] + u(1-e^{u(\beta-1)})\} \right|^2 + \quad [50]$$

$$\left| H_{tt}^{measured} - \frac{M_0}{4\pi} \frac{e^u}{r^3} \left\{ -[1-u+u^2] + u \frac{\cos^2\theta}{\sin^2\theta}(1-e^{u(\beta-1)}) \right\} \right|^2 +$$

$$\left| H_{lt}^{measured} - \frac{M_0}{4\pi} \frac{e^u}{r^3} \left\{ u \frac{\cos\theta}{\sin\theta}(1-e^{u(\beta-1)}) \right\} \right|^2 +$$

$$\left| H_{uu}^{measured} - \frac{M_0}{4\pi} \frac{e^u}{r^3} \left\{ -[1-u+u^2] - \frac{u}{\sin^2\theta}(1-e^{u(\beta-1)}) + u^2 \left(1 - \frac{\alpha^2}{\beta} e^{u(\beta-1)}\right) \right\} \right|^2$$

Commercially available computer programs may be used to minimize the error function of Eq. 50. The minimization of the error as defined in Eq. 50 permits the use of measured values, as opposed to values that have been rotated through the azimuth and dip corrections, to simultaneously determine $R_H$, $R_V$ and $\theta$.

Note that if the deviation angle $\theta$ is already known, and is not small, then the any or all of the Eqs. 20–22 may be used to determine $R_H$ and $R_V$. For instance, both the R and X signals from $H_{ll}$ can be used to determine $R_H$ and $\beta$, then $R_V$ from $\beta$ if angle $\theta$ is known.

Figure 8:
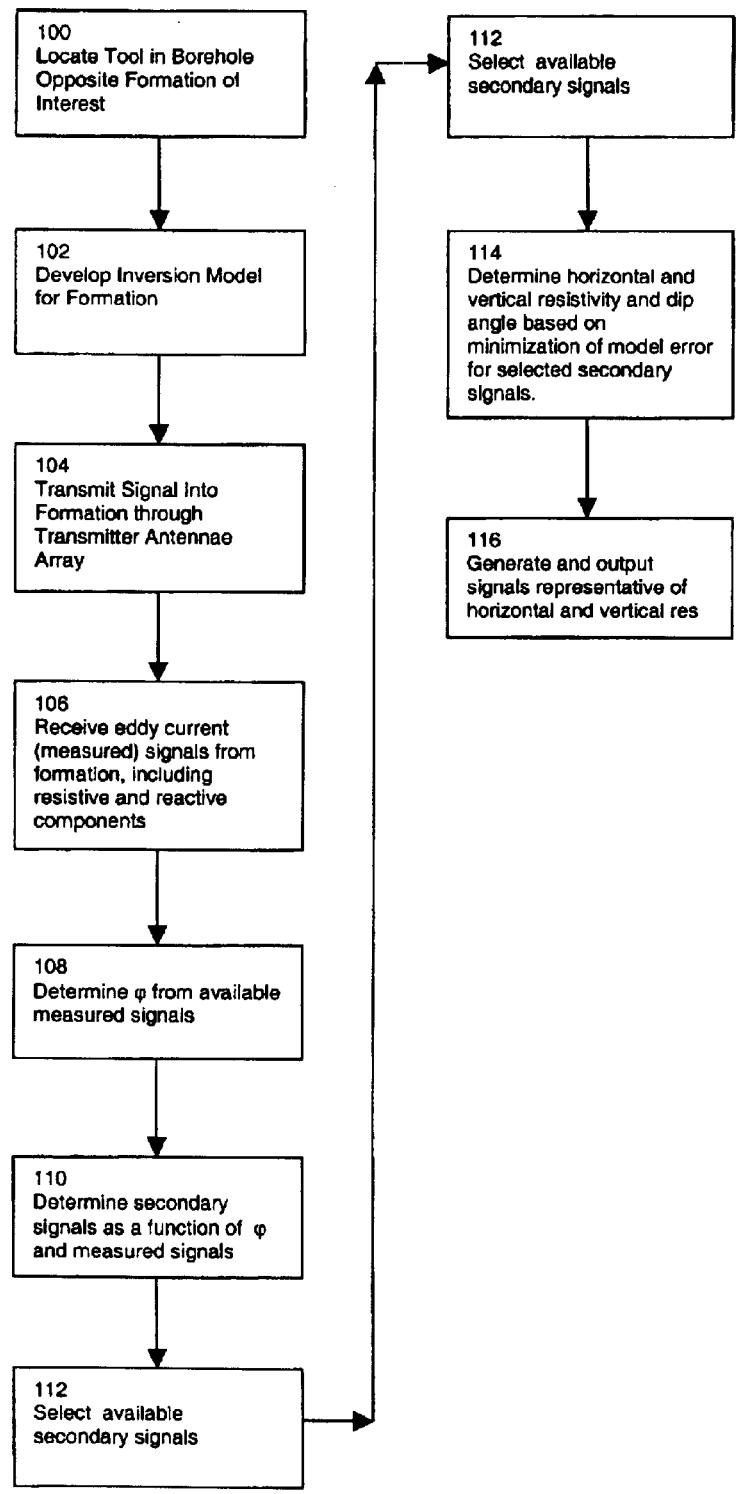
FIG. 8 is a flow chart depicting the operation of the method of the present invention.

FIG. 8 is a flow chart depicting the operation of the method of the present invention. In step 100, the orthogonal array induction tool 10 is either located opposite the formation of interest 4 on a wireline 6 or as part of an LWD tool (not shown). In step 102, the formation inversion model is created for the formation and the expected response. It will be appreciated that the sequence of steps between 100 and 102 are not dependent upon each other. i.e., the inversion model may be developed prior to positioning the induction tool opposite the formation of interest. In step 104, the induction tool 10 is energized to transmit an oscillating signal into the formation 4. The signals transmitted into the formation 4 create eddy currents in the formation 4 which are measured up by the orthogonal receiver array in tool 10. In receiving the signals, the tool retains both the resistive and reactive portion of the received signal.

It is recognized that not all signal values measured by the receiver antenna may be independent. As such, the azimuthal angle $\phi$ may be determined in step 108 based on the measured signals available. See Eqs. 26–30. Based on the azimuthal angle and the measured signals, a secondary set of signals can be determined from the measured signals in step 110. See. Eq. 9.

Selecting from the available secondary signals, which themselves are generated from available measured signals in step 112. The present invention determines the horizontal and vertical resistivity, along with the dip, simultaneously by minimization of error functions based on the inversion models in step 114. See, Eqs. 38–40 and 45–49. The specific minimization function in the equations is based on those secondary signals available. In step 116 a signal representative of the vertical and horizontal resistivity, as well as the dip angle is generated and output by tool 10.

The signal may then be transmitted up to a surface system utilizing a wireline 6 or by some other method from an LWD tool, such as pressure pulse or RF telemetry.

Accordingly, the preferred embodiment of the present invention discloses a means for determining earth formation anisotropic resistivity utilizing a multi-component induction tool. Moreover, a method is disclosed for performing inversion techniques to determine the said characteristics utilizing various combinations of R and X signals at varying antenna locations. Moreover, a method of determining formation deviation or dip angle has been disclosed.

While the invention is susceptible to various modifications and alternative forms, specific embodiments have been shown by way of example in the drawings and that have been described in detail herein. However, it should be understood that the invention is not intended to be limited to the particular forms disclosed. Rather, the invention is to cover all modifications, equivalents, an alternatives falling within the spirit and scope of the present invention as defined by the appended claims.

Appendix 1

Transformation between Formation and Borehole Coordinate Systems

Consider a multi-component induction resistivity tool whose antenna directions (l, m, n) are aligned to the (z, x, y) axis in the formation.

$$H^{formation} = \begin{bmatrix} H_{zz} & H_{zx} & H_{zy} \\ H_{xz} & H_{xx} & H_{xy} \\ H_{yz} & H_{yx} & H_{yy} \end{bmatrix}$$

Figure 2A:
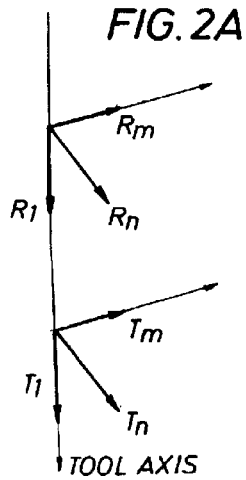
FIG. 2A depicts the orientation of the tool transmitters and receivers.
Figure 2B:
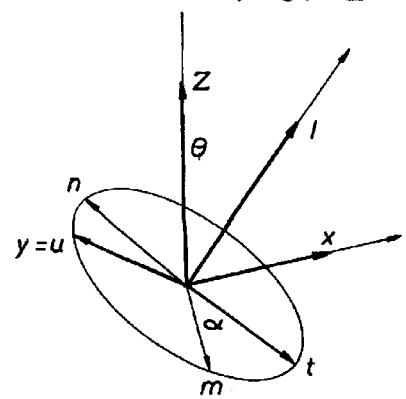
FIG. 2B depicts the relationship between the borehole, formation and tool coordinate systems.

Consider a deviated borehole in the formation. The deviation angle is noted as $\theta$. Without loss of generality, the deviated borehole is in the x-axis direction horizontally (FIG. 2). Consider a borehole coordinate system (l, t, u) where the u-axis coincides with the formation's y-axis. The borehole coordinate system and the formation coordinate system are related by a rotational operation around the y-axis by an angle $\theta$.

$$\begin{bmatrix} \hat{l} \\ \hat{t} \\ \hat{u} \end{bmatrix} = \begin{bmatrix} \cos\theta & \sin\theta & 0 \\ -\sin\theta & \cos\theta & 0 \\ 0 & 0 & 1 \end{bmatrix} \begin{bmatrix} \hat{z} \\ \hat{x} \\ \hat{y} \end{bmatrix} = R_y(\theta) \begin{bmatrix} \hat{z} \\ \hat{x} \\ \hat{y} \end{bmatrix}$$

Consider the multi-component induction tool whose antenna directions are aligned to the (l, t, u) direction.

$$H^{borehole} = \begin{bmatrix} H_{ll} & H_{xy} & H_{xz} \\ H_{yx} & H_{yy} & H_{yz} \\ H_{zx} & H_{zy} & H_{zz} \end{bmatrix}$$

$H^{borehole}$ and $H^{formation}$ are related by the rotation as, $$\begin{bmatrix} H_{zz} & H_{zx} & H_{zy} \\ H_{xz} & H_{xx} & H_{xy} \\ H_{yz} & H_{yx} & H_{yy} \end{bmatrix} = R_y(\theta)^{tr} \begin{bmatrix} H_{ll} & H_{lt} & H_{lu} \\ H_{tl} & H_{tt} & H_{tu} \\ H_{ul} & H_{ut} & H_{uu} \end{bmatrix} R_y(\theta)$$

$$= \begin{bmatrix} \cos\theta & -\sin\theta & 0 \\ \sin\theta & \cos\theta & 0 \\ 0 & 0 & 1 \end{bmatrix} \begin{bmatrix} H_{ll} & H_{lt} & H_{lu} \\ H_{tl} & H_{tt} & H_{tu} \\ H_{ul} & H_{ut} & H_{uu} \end{bmatrix} \begin{bmatrix} \cos\theta & \sin\theta & 0 \\ -\sin\theta & \cos\theta & 0 \\ 0 & 0 & 1 \end{bmatrix}$$

Or, in terms of individual components, $$H_{zz} = H_{ll}\cos^2\theta + H_{tt}\sin^2\theta - 2\cos\theta\sin\theta H_{lt} =$$

$$\frac{H_{ll}+H_{tt}}{2} + \frac{H_{ll}-H_{tt}}{2}\cos2\theta - H_{lt}\sin2\theta$$

$$H_{xx} = H_{ll}\sin^2\theta + H_{tt}\cos^2\theta + 2\cos\theta\sin\theta H_{lt} =$$

$$\frac{H_{ll}+H_{tt}}{2} - \frac{H_{ll}-H_{tt}}{2}\cos2\theta + H_{lt}\sin2\theta$$

$$H_{zx} = (H_{ll}-H_{tt})\cos\theta\sin\theta + (\cos^2\theta - \sin^2\theta)H_{lt} = \frac{H_{ll}-H_{tt}}{2}\sin2\theta + H_{lt}\cos2\theta$$

$H_{yz} = H_{ul}\cos\theta - H_{ul}\sin\theta$ $H_{yx} = H_{ul}\sin\theta + H_{ul\,\cos\theta}$ $H_{yy} = H_{uu}$ The first three equations are rewritten as, $H_{xx} + H_{xx} = H_{ll} + H_{tt}$ $$\frac{H_{zz}-H_{xx}}{2} = \frac{H_{ll}-H_{tt}}{2}\cos2\theta - H_{lt}\sin2\theta$$

$$H_{zx} = \frac{H_{ll}-H_{tt}}{2}\sin2\theta + H_{lt}\cos2\theta$$

There are three independent invariants under this rotation:

$H_{yy} = H_{uu}$ $H_{xx} + H_{xx} = H_{ll} + H_{tt}$ $$\left(\frac{H_{zz}-H_{xx}}{2}\right)^2 + H_{zx}^2 = \left(\frac{H_{ll}-H_{tt}}{2}\right)^2 + H_{lt}^2$$

The right hand sides in all three equations can be related to the measurements. The left-hand sides are expressed as shown below as functions of σH, σv, and θ. These three equations can be used to invert the induction measurements to determine the formation anisotropic resistivity values and the deviation angle θ.

In a longitudinally anisotropic formation, $H_{yz}$ and $H_{yx}$ vanishes as shown below in Appendix 3. From this orthogonality condition, $H_{yz} = H_{ul}\cos\theta - H_{ul}\sin\theta = 0$ $H_{yz} = H_{ul}\sin\theta + H_{ul}\cos\theta = 0$ the following two measurements are also zeros:

$H_{ul} = H_{ul} = 0$.

Appendix 2

Transformation between Tool and Borehole Coordinate Systems

Rotate the tool around the tool's l-axis by an angle φ

$$\begin{bmatrix} \hat{l} \\ \hat{m} \\ \hat{n} \end{bmatrix} = \begin{bmatrix} 1 & 0 & 0 \\ 0 & \cos\varphi & \sin\varphi \\ 0 & -\sin\varphi & \cos\varphi \end{bmatrix} \begin{bmatrix} \hat{l} \\ \hat{t} \\ \hat{u} \end{bmatrix} = R_l(\varphi) \begin{bmatrix} \hat{l} \\ \hat{t} \\ \hat{u} \end{bmatrix}$$

$H^{borehole}$ and $H^{tool}$ are related by the rotation as, $$\begin{bmatrix} H_{ll} & H_{lt} & H_{lu} \\ H_{tl} & H_{tt} & H_{tu} \\ H_{ul} & H_{ut} & H_{uu} \end{bmatrix} = R_l(\varphi)^{tr} \begin{bmatrix} H_{ll} & H_{lm} & H_{ln} \\ H_{ml} & H_{mm} & H_{mn} \\ H_{nl} & H_{nm} & H_{nn} \end{bmatrix} R_l(\varphi)$$

$$= \begin{bmatrix} 1 & 0 & 0 \\ 0 & \cos\varphi & -\sin\varphi \\ 0 & \sin\varphi & \cos\varphi \end{bmatrix} \begin{bmatrix} H_{ll} & H_{lm} & H_{ln} \\ H_{ml} & H_{mm} & H_{mn} \\ H_{nl} & H_{nm} & H_{nn} \end{bmatrix} \begin{bmatrix} 1 & 0 & 0 \\ 0 & \cos\varphi & \sin\varphi \\ 0 & -\sin\varphi & \cos\varphi \end{bmatrix}$$

Or, in terms of individual components, $H_{ll} = H_{ll}$ $H_{lt} = H_{lm}\cos\varphi - H_{ln}\sin\varphi$ $H_{lu} = H_{lm}\sin\varphi + H_{ln}\cos\varphi$ $$H_{tt} = H_{mm}\cos^2\varphi + H_{nn}\sin^2\varphi - 2\cos\varphi\sin\varphi H_{mn} =$$

$$\frac{H_{mm}+H_{nn}}{2} + \frac{H_{mm}-H_{nn}}{2}\cos2\varphi - H_{mn}\sin2\varphi$$

$$H_{uu} = H_{mm}\sin^2\varphi + H_{nn}\cos^2\varphi + 2\cos\varphi\sin\varphi H_{mn} =$$

$$\frac{H_{mm}+H_{nn}}{2} - \frac{H_{mm}-H_{nn}}{2}\cos2\varphi + H_{mn}\sin2\varphi$$

$$H_{tu} = (H_{mm} - H_{nn})\cos\varphi\sin\varphi + (\cos^2\varphi - \sin^2\varphi)H_{mn} =$$

$$\frac{H_{mm}-H_{nn}}{2}\sin2\varphi + H_{mn}\cos2\varphi$$

The last three equations are rewritten as, $H_{tt} + H_{uu} = H_{mm} + H_{nn}$ $$\frac{H_{tt}-H_{uu}}{2} = \frac{H_{mm}-H_{nn}}{2}\cos2\varphi - H_{mn}\sin2\varphi$$

$$H_{tu} = \frac{H_{mm}-H_{nn}}{2}\sin2\varphi + H_{mn}\cos2\varphi$$

There are three independent invariants under this rotation.

$H_{ll} = H_{ll}$ $H_{tt} + H_{uu} = H_{mm} + H_{nn}$ $$\left(\frac{H_{tt}-H_{uu}}{2}\right)^2 + H_{tu}^2 = \left(\frac{H_{mm}-H_{nn}}{2}\right)^2 + H_{mn}^2$$

The orthogonality condition, $H_{ul=Hul}=0$, implies $$H_{tu}=H_{lm}\sin\phi+H_{ln}\cos\phi=0$$

$$H_{tu}=\frac{H_{mn}-H_{nn}}{2}\sin2\varphi+H_{mn}\cos2\varphi=0$$

Thus, the azimuthal angle $\phi$ can be determined from a set of ($H_{lm}$, $H_{ln}$) measurements or ($H_{mm}$, $H_{nn}$, $H_{mn}$) measurements.

is solved and the azimuthal angle $\alpha$ is given by, $$\tan\varphi=-\frac{H_{ln}}{H_{lm}};\quad \cos\varphi=\frac{H_{lm}}{\sqrt{H_{lm}^2+H_{ln}^2}},\quad \sin\varphi=-\frac{H_{ln}}{\sqrt{H_{lm}^2+H_{ln}^2}}$$

$$\tan2\varphi=-\frac{2H_{mn}}{H_{mm}-H_{nn}}=\frac{2\tan\varphi}{1-\tan^2\varphi}$$

And, ($H_{lm}$, $H_{ln}$, $H_{mm}$, $H_{nn}$, $H_{mn}$) must satisfy the following consistency condition:

$$H_{mn}=\frac{(H_{mm}-H_{nn})H_{lm}H_{ln}}{(H_{lm}^2-H_{ln}^2)}$$

This is obtained by eliminating $\phi$ as $$H_{tu}=\frac{H_{mm}-H_{nn}}{2}\sin2\varphi+H_{mn}\cos2\varphi$$

$$=\frac{-(H_{mm}-H_{nn})H_{lm}H_{ln}+(H_{lm}^2-H_{ln}^2)H_{mn}}{H_{lm}^2+H_{ln}^2}=0$$

The four measurements ($H_{ll}$, $H_{lt}$, $H_{tt}$, $H_{uu}$) in the borehole (l,t,u) coordinate system are provided with five ($H_{ll}$, $H_{lm}$, $H_{ln}$, $H_{mm}$, $H_{nn}$) measurements in the (l,m,n) coordinate system as below:

$$H_{ll}=H_{ll}$$

$$H_{lt}=H_{lm}\cos\varphi-H_{ln}\sin\varphi=\sqrt{H_{lm}^2+H_{ln}^2}$$

$$H_{tt}=H_{mm}\cos^2\varphi+H_{nn}\sin^2\varphi-2\cos\varphi\sin\varphi H_{mn}$$

$$=\frac{H_{mm}+H_{nn}}{2}+\frac{H_{mm}-H_{nn}}{2}\cos2\varphi-H_{mn}\sin2\varphi$$

$$=\frac{H_{mm}H_{lm}^2+H_{nn}H_{ln}^2+2H_{lm}H_{ln}H_{mn}}{H_{lm}^2+H_{ln}^2}$$

$$=\frac{H_{mm}H_{lm}^2-H_{nn}H_{ln}^2}{H_{lm}^2-H_{ln}^2}$$

$$H_{uu}=H_{mm}\sin^2\varphi+H_{nn}\cos^2\varphi+2\cos\varphi\sin\varphi H_{mn}$$

$$=\frac{H_{mm}+H_{nn}}{2}-\frac{H_{mm}-H_{nn}}{2}\cos2\varphi+H_{mn}\sin2\varphi$$

$$=\frac{H_{mm}H_{ln}^2+H_{nn}H_{lm}^2-2H_{lm}H_{ln}H_{mn}}{H_{lm}^2+H_{ln}^2}$$

$$=\frac{H_{nn}H_{lm}^2-H_{mm}H_{ln}^2}{H_{lm}^2-H_{ln}^2}$$

If $H_{mn}$ is measured additionally, then the orthogonality condition above can be used for a consistency check (QC).

Appendix 3

Determination of $\sigma H$, $\sigma v$, and $\theta$.

In the formation coordinate system (z, x, y), $$H_{zz}=\frac{M_z}{4\pi}\left\{(3(1-u)+u^2)\frac{z^2}{r^2}-(1-u+u^2)\right\}\frac{e^u}{r^3}$$

$$H_{zx}=\frac{M_z}{4\pi}\left\{(3(1-u)+u^2)\frac{xz}{r^2}\right\}\frac{e^u}{r^3}$$

$$H_{xx}=\frac{M_x}{4\pi}\left\{(3(1-u)+u^2)\frac{x^2}{r^2}-(1-u+u^2)\right\}\frac{e^u}{r^3}+I_0$$

$$H_{yy}=\frac{M_y}{4\pi}\left\{-(1-u+u^2)\right\}\frac{e^u}{r^3}-I_0+I_1$$

where $$u=ik_H r$$

$$r=\sqrt{x^2+y^2+z^2};\quad \rho=\sqrt{x^2+y^2}$$

and at a receiver located at $(z,x,y)=(L\cos\theta, L\sin\theta, 0)$, $$I_0=\frac{M_z}{4\pi}\left\{\frac{u}{r}(e^u-e^{u\beta})\right\}\frac{1}{\rho^2}=\frac{M_z}{4\pi}\frac{e^u}{r^3}\left\{\frac{u}{\sin^2\theta}(1-e^{u(\beta-1)})\right\}$$

$$=\frac{M_z}{4\pi}\frac{e^u}{r^3}\tilde{I}_0$$

$$I_1=\frac{M_z}{4\pi}\frac{e^u}{r^3}u^2\left(1-\frac{\alpha^2}{\beta}e^{u(\beta-1)}\right)=\frac{M_z}{4\pi}\frac{e^u}{r^3}\tilde{I}_1$$

$$\beta=\sqrt{\cos^2\theta+\alpha^2\sin^2\theta};\quad \alpha^2=\frac{\sigma_V}{\sigma_H}$$

$$r=L;\quad \rho=L\sin\theta$$

We also set that all the transmitter have the identical strength: $M_l=M_t=M_u=M_0$.

Then, $$H_{zz}+H_{xx}=\frac{M_0}{4\pi}\frac{e^u}{r^3}\left\{[1-u-u^2]+\frac{u}{\sin^2\theta}(1-e^{u(\beta-1)})\right\}$$

$$H_{zz}-H_{xx}=\frac{M_0}{4\pi}\frac{e^u}{r^3}\left\{[3(1-u)+u^2](\cos^2\theta-\sin^2\theta)-\frac{u}{\sin^2\theta}(1-e^{u(\beta-1)})\right\}$$

$$H_{zx}=\frac{M_0}{4\pi}\frac{e^u}{r^3}\{3(1-u)+u^2\}\cos\theta\sin\theta$$

$$H_{yy}=$$

$$H_{yy}=\frac{M_0}{4\pi}\frac{e^u}{r^3}\left\{-[1-u+u^2]-\frac{u}{\sin^2\theta}(1-e^{u(\beta-1)})+u^2\left(1-\frac{\alpha^2}{\beta}e^{u(\beta-1)}\right)\right\}$$

Three invariants are then written as, $$H_{zz}+H_{xx}=\frac{M_0}{4\pi}\frac{e^u}{r^3}\left\{[1-u-u^2]+\frac{u}{\sin^2\theta}(1-e^{u(\beta-1)})\right\}$$

$$\left(\frac{H_{zz}-H_{xx}}{2}\right)^2+H_{zx}^2=$$

$$\frac{1}{4}\left(\frac{M_0}{4\pi}\frac{e^u}{r^3}\right)^2\left\{(3(1-u)+u^2)^2-2\tilde{I}_0\cos2\theta[3(1-u)+u^2]+\tilde{I}_0^2\right\}$$

$$H_{yy}=\frac{M_0}{4\pi}\frac{e^u}{r^3}\left\{-[1-u+u^2]-\frac{u}{\sin^2\theta}(1-e^{u(\beta-1)})+u^2\left(1-\frac{\alpha^2}{\beta}e^{u(\beta-1)}\right)\right\}$$

where $$\tilde{I}_0 = \frac{u}{\sin^2\theta}(1 - e^{u(\beta-1)})$$

$$\beta = \sqrt{\cos^2\theta + \alpha^2\sin^2\theta}\,;\quad \alpha^2 = \frac{1}{\lambda^2} = \frac{\sigma_V}{\sigma_H}$$

There are three invariants: There are three unknowns, $k_H$, $\lambda$, and $\theta$.

Or, simply using all 4 equations for $H_{xx}$, $H_{xz}$, $H_{zz}$, and $H_{yy}$, one can determine $k_H$, $\lambda$, and $\theta$.

Since $$H_{yy} = H_{uu}$$

$$H_{zz} + H_{xx} = H_{ll} + H_{tt}$$

$$\left(\frac{H_{zz} - H_{xx}}{2}\right)^2 + H_{zx}^2 = \left(\frac{H_{ll} - H_{tt}}{2}\right)^2 + H_{lt}^2$$

the above equations hold also in the (l,t,u) tool coordinates.

But, it turns out the following may be easier to solve for $k_H$, $\beta$, and $\theta$, hence $\lambda$.

$$H_{ll} = \frac{M_0}{4\pi}\frac{e^u}{r^3}\{2[1-u] + u(1 - e^{u(\beta-1)})\}$$

$$H_{tt} = \frac{M_0}{4\pi}\frac{e^u}{r^3}\left\{-1[1-u+u^2] + u\frac{\cos^2\theta}{\sin^2\theta}(1 - e^{u(\beta-1)})\right\}$$

$$H_{lt} = \frac{M_0}{4\pi}\frac{e^u}{r^3}\left\{u\frac{\cos\theta}{\sin\theta}(1 - e^{u(\beta-1)})\right\}$$

$$H_{uu} = \frac{M_0}{4\pi}\frac{e^u}{r^3}\left\{-[1-u+u^2] - \frac{u}{\sin^2\theta}(1 - e^{u(\beta-1)}) + u^2\left(1 - \frac{\alpha^2}{\beta}e^{u(\beta-1)}\right)\right\}$$

At $\theta = 0$, $$H_{ll} = \frac{M_0}{4\pi}\frac{e^u}{r^3}\{2[1-u]\}$$

$$H_{tt} = \frac{M_0}{4\pi}\frac{e^u}{r^3}\left\{-\left[1-u+u^2\frac{\alpha^2+1}{2}\right]\right\}$$

$$H_{lt} = 0$$

$$H_{uu} = H_{tt}$$

At $\theta = /2$, $$H_{ll} = \frac{M_0}{4\pi}\frac{e^u}{r^3}\{2[1-u] + u(1 - e^{u(\beta-1)})\}$$

$$H_{tt} = -\frac{M_0}{4\pi}\frac{e^u}{r^3}\{1 - u + u^2\}$$

$$H_{uu} = \frac{M_0}{4\pi}\frac{e^u}{r^3}\{-[1-u+u^2] - u(1 - e^{u(\alpha-1)}) + u^2(1 - \alpha e^{u(\beta-1)})\}$$

$$H_{lt} = 0$$

$$H_{ul} = 0$$

$$H_{ut} = 0$$

What is claimed:

1. A method for determining the horizontal resistivity and vertical resistivity of an earth formation, the earth formation being penetrated by a borehole, comprising:

(a) developing an inversion model for various earth formations;
    (b) deploying an induction tool in said borehole, said tool having a longitudinal axis, a transmitter array comprised three mutually orthogonal transmitter antennae, at least one of the antenna being oriented parallel to said tool longitudinal axis, and a receiver array offset from the transmitter array, said receiver array being comprised of three mutually orthogonal receiver antennae, the receiving array sharing a common orientation with said transmitter array;
    (c) activating said transmitter antenna array and measuring electromagnetic signals values induced in said receiving array antennae, including resistive and reactive components of said signal values;
    (d) determining an azimuth angle for said tool;
    (e) calculating secondary signal values signals as a function of said measured signal values and said azimuth angle; and
    (f) simultaneously determining said horizontal resistivity, vertical resistivity and a dip angle as a function of selected resistive and reactive components of said secondary signals by minimizing error utilizing said inversion model.

2. The method of claim 1, wherein said azimuth angle is calculated as a function of said electromagnetic signals in said receiver array antennae perpendicular to said tool longitudinal axis, relative to a direction of said horizontal resistivity and said vertical resistivity.

3. The method of claim 1, wherein step (f) further includes the simultaneous determination of a dip angle.

4. The method of claim 1, wherein said secondary signal values are calculated by rotating said measured signals values through a negative of said azimuth angle.

5. The method of claim 2, wherein step (f) further includes the simultaneous determination of a dip angle.

6. The method of claim 3, wherein said dip angle is calculated as a function of said secondary values for said electromagnetic signals for a receiver antenna parallel to said tool longitudinal axis with respect to said vertical resistivity.

* * * * *